US012713376B2

(12) United States Patent
Yuan et al.

(10) Patent No.: US 12,713,376 B2
(45) Date of Patent: Aug. 18, 2026

(54) DYNAMIC SWITCHING BETWEEN DIFFERENT UL TIMINGS FOR MDCI MTRP

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 18/718,410

(22) PCT Filed: Feb. 23, 2022

(86) PCT No.: PCT/CN2022/077367

§ 371 (c)(1),
(2) Date: Jun. 10, 2024

(87) PCT Pub. No.: WO2023/159366

PCT Pub. Date: Aug. 31, 2023

(65) Prior Publication Data

US 2025/0056455 A1 Feb. 13, 2025

(51) Int. Cl.
*H04W 56/00* (2009.01)

(52) U.S. Cl.
CPC ..... *H04W 56/0045* (2013.01); *H04W 56/001* (2013.01)

(58) Field of Classification Search
CPC ........................ H04W 56/0045; H04W 56/001
See application file for complete search history.

(56) References Cited

U.S. PATENT DOCUMENTS

| | | | | |
|---|---|---|---|---|
| 2017/0325248 | A1 | 11/2017 | Mizusawa | |
| 2025/0063632 | A1* | 2/2025 | Yuan | H04L 1/06 |
| 2025/0159631 | A1* | 5/2025 | Zhang | H04W 74/006 |
| 2025/0351195 | A1* | 11/2025 | Guo | H04W 56/0045 |

FOREIGN PATENT DOCUMENTS

| | | | |
|---|---|---|---|
| CN | 111066362 | A | 4/2020 |
| WO | 2022020060 | A1 | 1/2022 |

OTHER PUBLICATIONS

International Search Report and Written Opinion—PCT/CN2022/077367—ISA/CN—Oct. 10, 2022.

* cited by examiner

*Primary Examiner* — Melvin C Marcelo
(74) *Attorney, Agent, or Firm* — Procopio, Cory, Hargreaves & Savitch LLP

(57) ABSTRACT

Apparatus, methods, and computer program products for dynamic switching between different UL timings for mDCI mTRP are provided. An example method may include receiving, from a network entity, a first timing advance (TA) group (TAG) configuration. The example method may further include receiving, from the network entity, a second TAG configuration. The example method may further include applying the first TAG configuration or the second TAG configuration based on a dynamic switch configuration representing a UL transmission alignment or non-alignment for a first TRP associated with the network entity or a second TRP associated with the network entity.

30 Claims, 16 Drawing Sheets

400

TRP 1 404A

PUSCH 1 406A

PDCCH 1 408A

UE 402

PUSCH 2 406B

PDCCH 2 408B

TRP 2 404B

450

Downlink frame *i* 452

Uplink frame *i* 454

456

$(N_{TA} + N_{TA,offset})T_c$

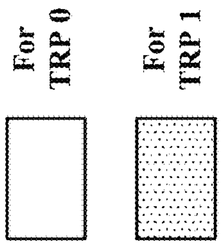
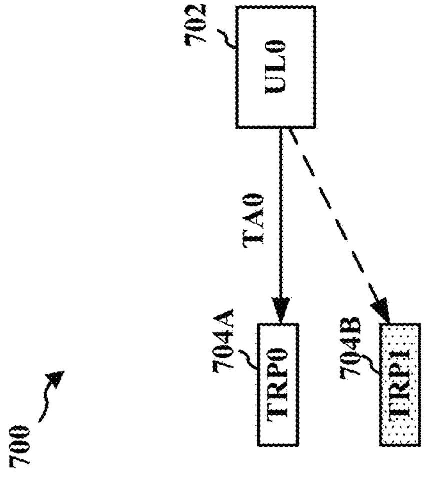
FIG. 7A
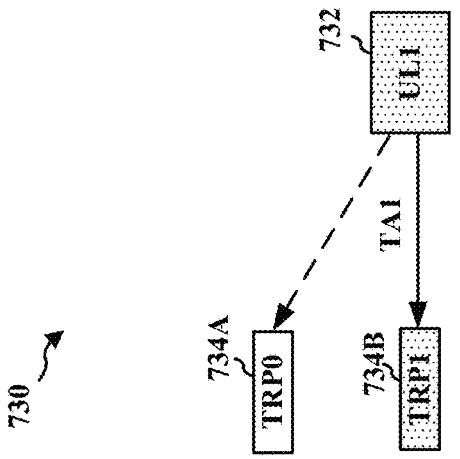
FIG. 7B
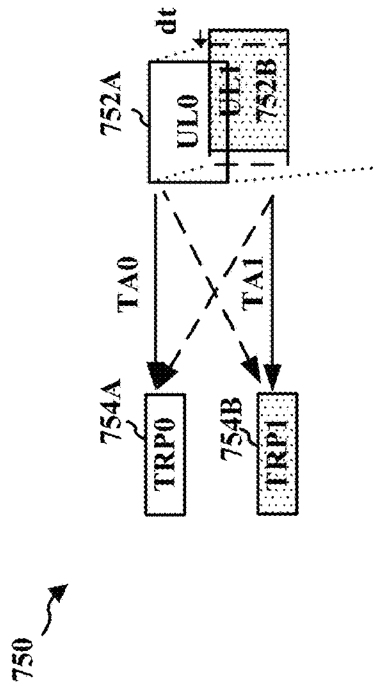
FIG. 7C
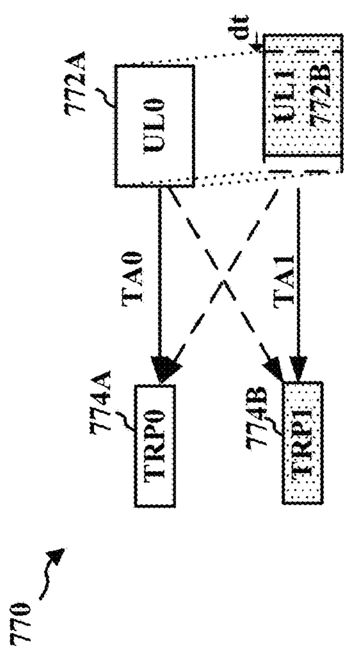
FIG. 7D

1300

1402
Transmit a first TAG configuration for a UE
1404
Transmit a second TAG configuration for the UE
1406
Transmit an indication of a dynamic switch configuration representing an UL transmission alignment or non-alignment for the UE corresponding to a first TRP associated with the network entity or a second TRP associated with the network entity, the dynamic switch configuration being associated with an application of the first TAG configuration or the second TAG configuration

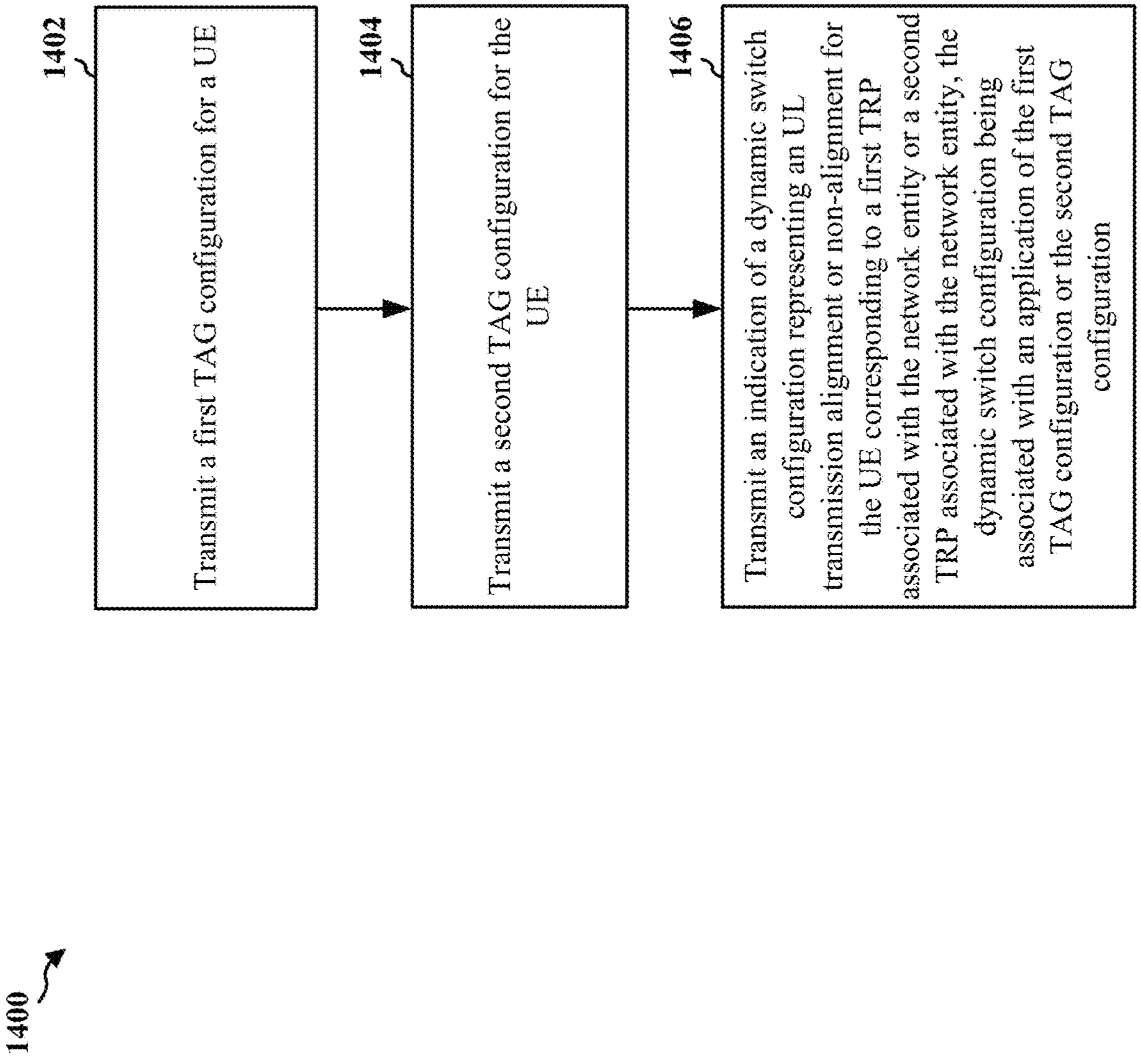

DYNAMIC SWITCHING BETWEEN DIFFERENT UL TIMINGS FOR MDCI MTRP

CROSS REFERENCE TO RELATED APPLICATIONS

This application is a National Stage Application filed under 35 U.S.C. § 371 of PCT International Application Serial No. PCT/CN2022/077367 entitled "DYNAMIC SWITCHING BETWEEN DIFFERENT UL TIMINGS FOR MDCI MTRP" and filed on Feb. 23, 2022, which is expressly incorporated by reference herein in its entirety.

TECHNICAL FIELD

The present disclosure relates generally to communication systems, and more particularly, to wireless communication systems with timing advance (TA) groups (TAGs) and transmission reception points (TRPs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a network entity, a first TAG configuration. The memory and the at least one processor coupled to the memory may be further configured to receive, from the network entity, a second TAG configuration. The memory and the at least one processor coupled to the memory may be further configured to apply the first TAG configuration or the second TAG configuration based on a dynamic switch configuration representing a UL transmission alignment or non-alignment for a first TRP associated with the network entity or a second TRP associated with the network entity.

In another aspect of the disclosure, a method, a computer-readable medium, and an apparatus at a network entity are provided. The apparatus may include a memory and at least one processor coupled to the memory. The memory and the at least one processor coupled to the memory may be configured to transmit a first TAG configuration for a UE. The memory and the at least one processor coupled to the memory may be further configured to transmit a second TAG configuration for the UE. The memory and the at least one processor coupled to the memory may be further configured to transmit an indication of a dynamic switch configuration representing a UL transmission alignment or non-alignment for the UE corresponding to a first TRP associated with the network entity or a second TRP associated with the network entity, the dynamic switch configuration may be associated with an application of the first TAG configuration or the second TAG configuration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 7A is a diagram illustrating a TRP0 scheduling.

FIG. 7B is a diagram illustrating a TRP1 scheduling.

FIG. 7C is a diagram illustrating a multi-TRP (mTRP) scheduling.

FIG. 7D is a diagram illustrating a mTRP scheduling.

FIG. 14 is a flowchart of a method of wireless communication.

DETAILED DESCRIPTION

Figure 1:
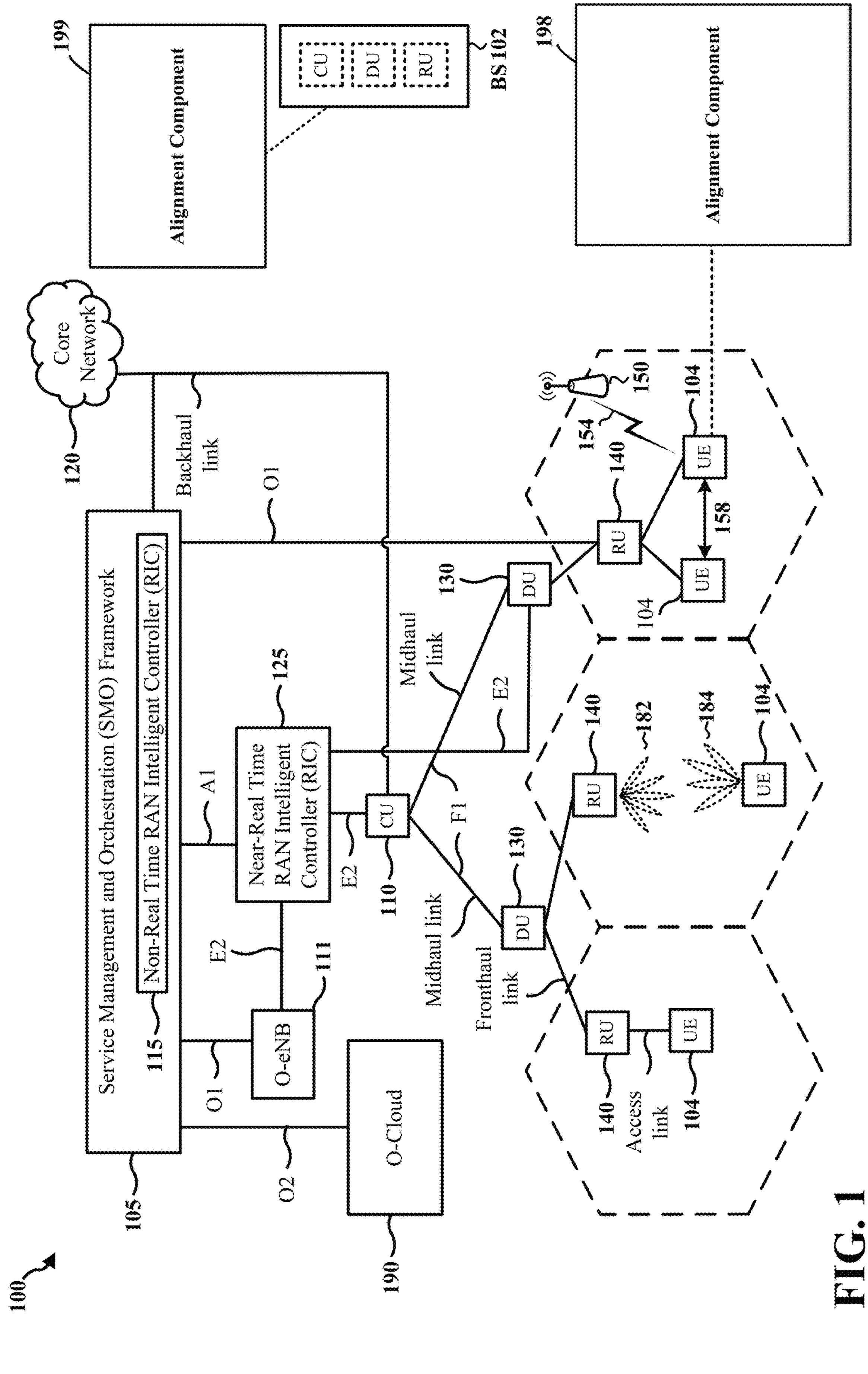
FIG. 1 is a diagram illustrating an example of a wireless communications system and an access network.

Example aspects provided herein support using multiple TAs for multi-downlink control information (mDCI) and multi-transmission reception point (mTRP) and support dynamic switching between an alignment of UL transmissions for multiple TRPs and a non-alignment of multiple transmissions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, cNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an alignment component 198. In some aspects, the alignment component 198 may be configured to receive, from a network entity, a first TAG configuration. In some aspects, the alignment component 198 may be further configured to receive, from the network entity, a second TAG configuration. In some aspects, the alignment component 198 may be further configured to apply the first TAG configuration or the second TAG configuration based on a dynamic switch configuration representing a UL transmission alignment or non-alignment for a first TRP associated with the network entity or a second TRP associated with the network entity.

In certain aspects, the base station 102 may include an alignment component 199. In some aspects, the alignment component 199 may be configured to transmit a first TAG configuration for a UE. In some aspects, the alignment component 199 may be further configured to transmit a second TAG configuration for the UE. In some aspects, the alignment component 199 may be further configured to transmit an indication of a dynamic switch configuration representing a UL transmission alignment or non-alignment for the UE corresponding to a first TRP associated with the network entity or a second TRP associated with the network entity, the dynamic switch configuration may be associated with an application of the first TAG configuration or the second TAG configuration.

Figure 2B:
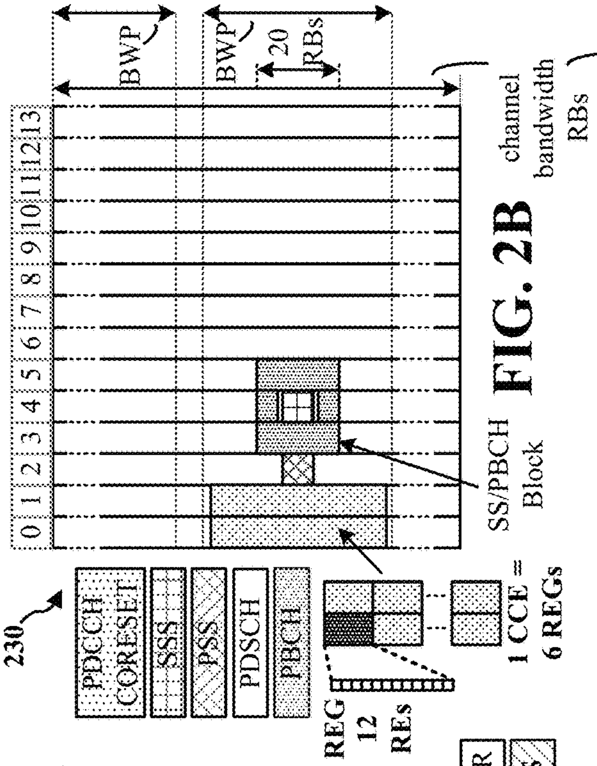
FIG. 2B is a diagram illustrating an example of downlink (DL) channels within a subframe, in accordance with various aspects of the present disclosure.
Figure 2D:
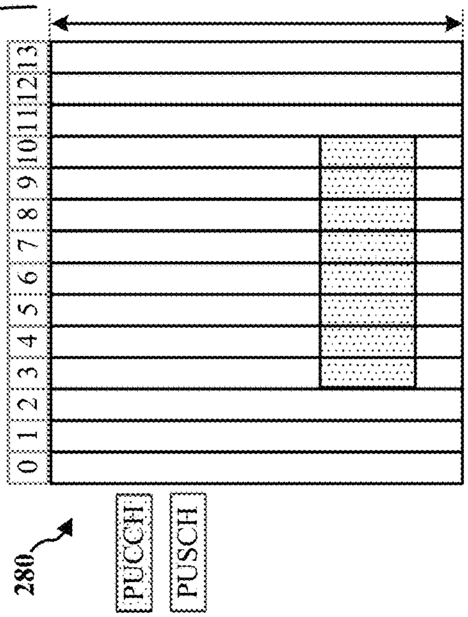
FIG. 2D is a diagram illustrating an example of uplink (UL) channels within a subframe, in accordance with various aspects of the present disclosure.
Figure 2A:
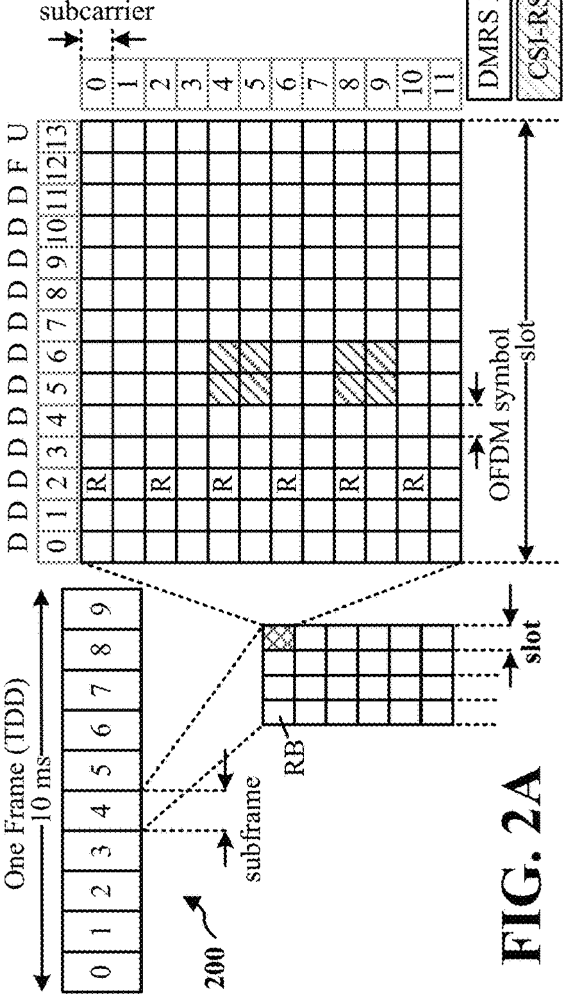
FIG. 2A is a diagram illustrating an example of a first frame, in accordance with various aspects of the present disclosure.
Figure 2C:
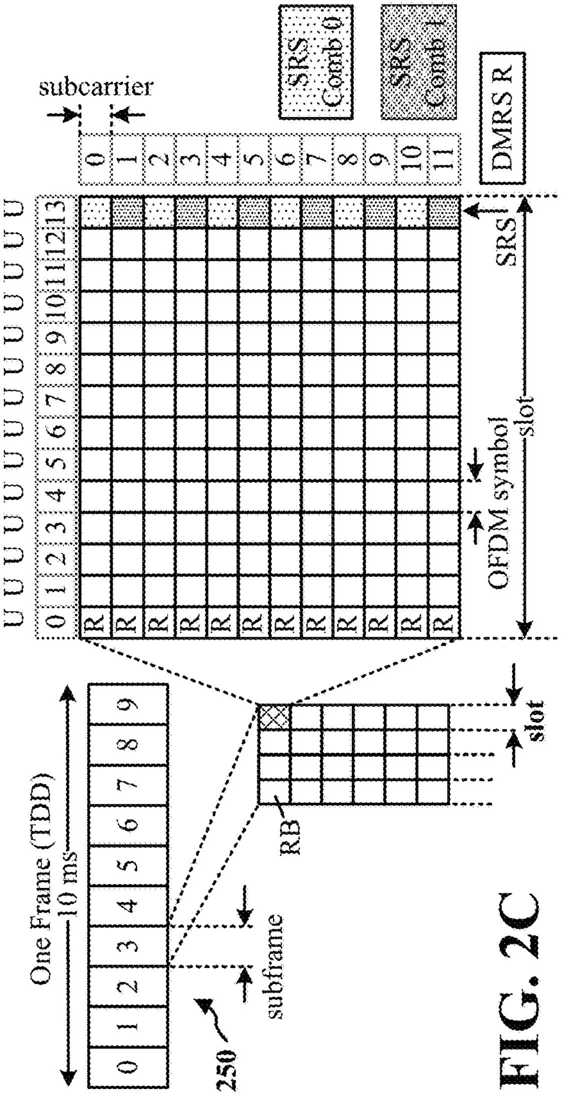
FIG. 2C is a diagram illustrating an example of a second frame, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and 2" slots/subframe. The subcarrier spacing may be equal to $2^{\mu}*15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
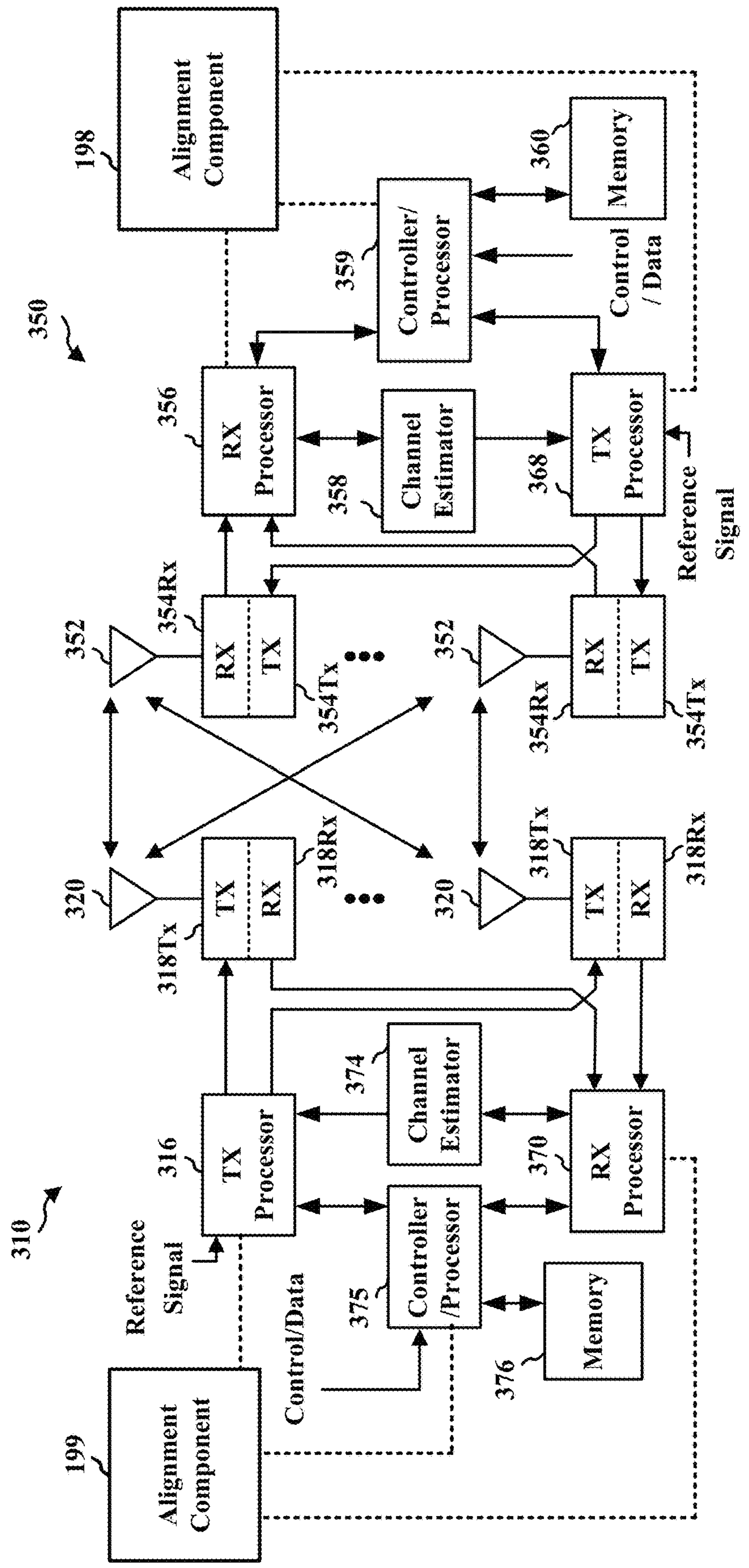
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality. The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with alignment component 198 of FIG. 1.

At least one of the TX processor 316, the RX processor 370, and the controller/processor 375 may be configured to perform aspects in connection with alignment component 199 of FIG. 1.

Figure 4A:
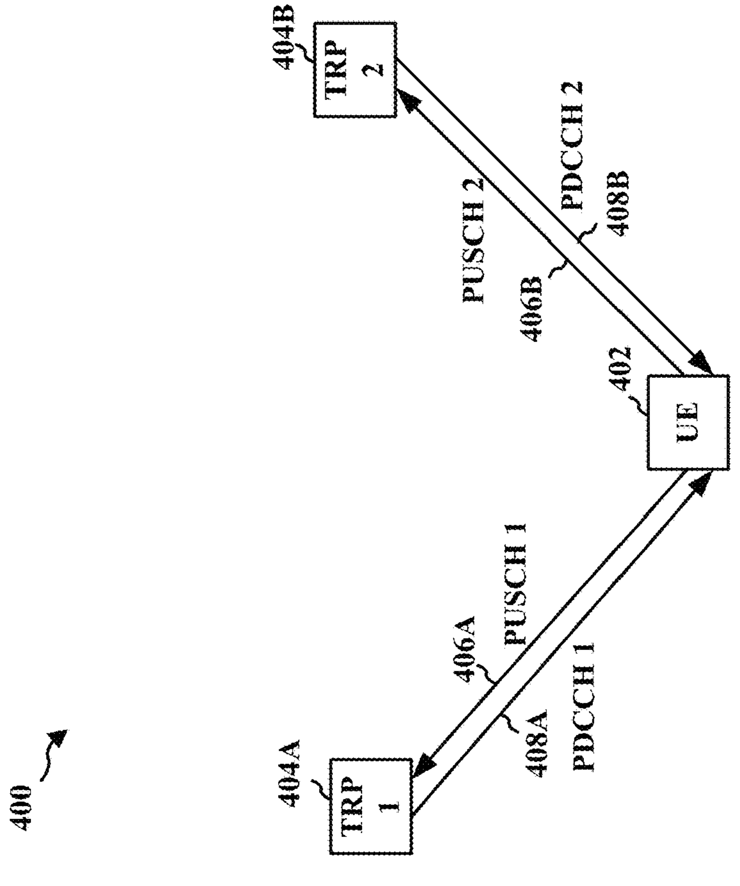
FIG. 4A is a diagram illustrating example communications between a UE and two TRPs.

FIG. 4A is a diagram 400 illustrating example communications between a UE and two TRPs. As illustrated in FIG. 4A, a UE 402 may be simultaneously connected to a first TRP 404A and a second TRP 404B. In some aspects, the UE 402 may receive a first PDCCH 408A from the first TRP 404A. The UE 402 may also transmit a first PUSCH 406A to the first TRP 404A. In some aspects, the UE 402 may receive a second PDCCH 408B from the second TRP 404B. The UE 402 may also transmit a second PUSCH 406B to the second TRP 404B.

Figure 4B:
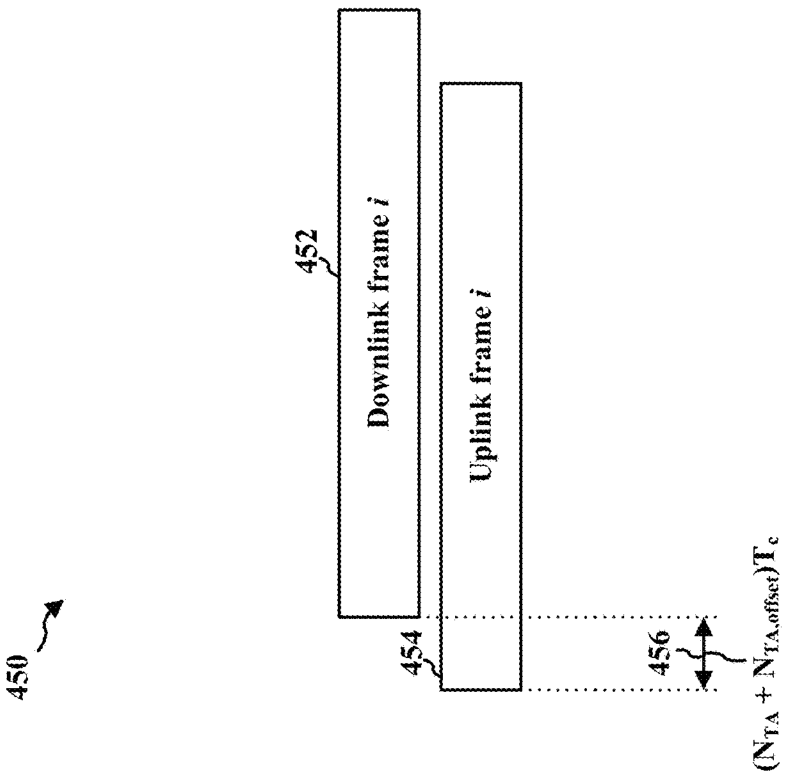
FIG. 4B is a diagram illustrating example TA.

A UE may transmit a UL signal to a base station or a TRP. The UL signal may take a length of time to reach the destination base station or the TRP because the signal may travel from the UE to the destination base station or TRP for a length of time. Therefore, to meet a defined arrival time (e.g., defined based on slots or other units) in a wireless communication system, a UE in the wireless communication system may transmit UL signals based on a TA. As one example, the UE may transmit a UL signal a length of time before the defined arrival time based on a TA (e.g., to compensate the delay due to a distance between the UE and the TRP). FIG. 4B is a diagram 450 illustrating an example TA. As illustrated in FIG. 4B, a DL frame of frame number i 452 and an associated UL frame of frame number i 454 may be transmitted on a RF carrier. The UL frame of frame number i 454 may start in advance of the DL frame of frame number i 452 by a TA 456 that may be equal to $(N_{TA}+N_{TA,offset})T_e$. The parameter $T_e$ may represent a basic time unit, such as a one-bit period (e.g., approximately 3.69 microseconds). The parameter $N_{TA,offset}$ may represent a TA defined based on a frequency band. The parameter $N_{TA}$ may represent a TA that may be defined or signaled based on a location of the UE and the TRP or base station.

By way of example, in some wireless communication systems, the TA may be a value between 0 and 63, with each step between 0 and 63 representing an advance of one-bit period (e.g., approximately 3.69 microseconds). With signals (radio waves) travelling at about 300,000,000 meters per second (i.e., 300 meters per microsecond), one TA step then represents a change in round-trip distance (twice the propagation range) of approximately 1,100 meters. Therefore, in such an example, the TA may change for each 550-meter change in the range between the UE and the TRP/base station.

Figure 5B:
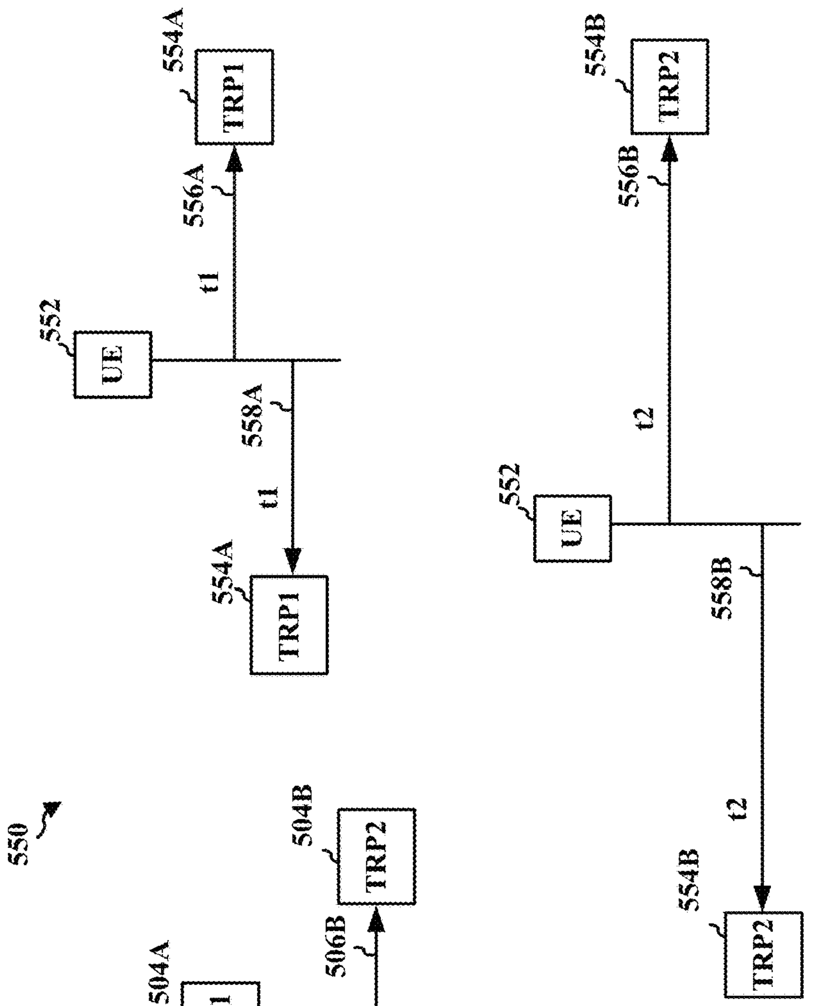
FIG. 5B is a diagram illustrating separate DL timing for different TRPs.
Figure 5A:
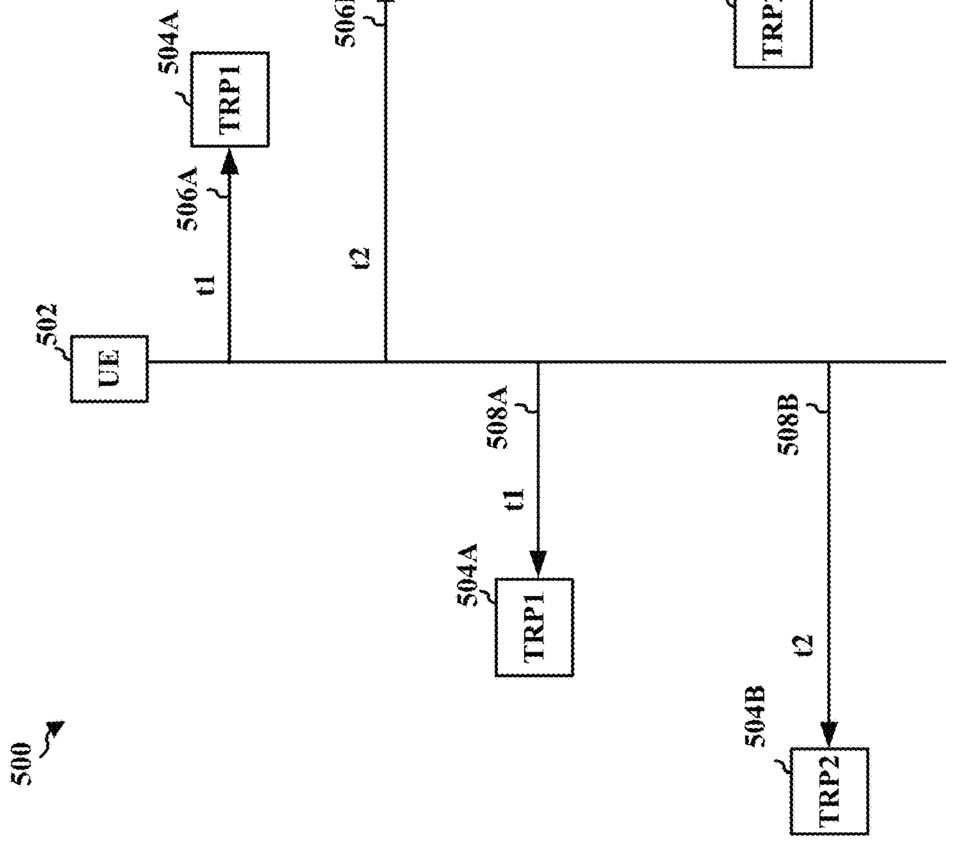
FIG. 5A is a diagram illustrating single downlink (DL) timing for different transmission reception points (TRPs).

Because TA may be based on a location of the TRP, in mTRP operations, two TAs may be defined for UL transmissions. For example, two TAs may be defined for UL multi-DCI for mTRP operation with two TRPs, a first TRP and a second TRP. FIGS. 5A-5B are diagrams 500 and 550 illustrating single DL timing or separate DL timing. As illustrated in FIG. 5A, in single DL timing, a UE 502 may transmit a transmission 506A to a first TRP 504A based on a first TA. In a same channel, the UE 502 may also transmit a transmission 506B to a second TRP 504B based on a second TA. The UE 502 may also transmit another transmission 508A to the first TRP 504A based on the first TA and transmit another transmission 508B to the second TRP 504B based on the second TA in a same channel.

As illustrated in FIG. 5B, in separate DL timing, a UE 552 may transmit a transmission 556A to a first TRP 554A based on a first TA. In the same channel at another time, the UE 552 may transmit another transmission 558A to the first TRP 554A based on the first TA. In a separate channel, the UE 552 may transmit a transmission 556B to a second TRP 554B based on a second TA. In the separate channel at another time, the UE 552 may transmit another transmission 558B to the second TRP 554B based on the second TA.

In some wireless communication systems, TA configuration may be multi-cell and BWP common while mTRP configurations may be CC or BWP specific. Example configurations are provided below:

```
ServingCellConfig ::= SEQUENCE {
  ...
  tag-Id,    TAG-Id
  downlinkBWP-ToReleaseList
  downlinkBWP-ToAddModList
  ...
}
BWP-DownlinkDedicated ::= SEQUENCE {
  pdcch-Config
  ...
}
PDCCH-Config ::= SEQUENCE {
  controlResourceSetToAddModList-r16
```

-continued

```
  controlResourceSetToReleaseList-r16
  ...
}
ControlResourceSet ::= SEQUENCE {
coresetPoolIndex-r16   INTEGER
(0..1)
  controlResourceSetId-r16
  ...
}
```

As previously described, in an information element (IE) for serving cell configuration (ServingCellConfig), IEs for TAG IDs, a list of BWP configurations of type BWP downlink (downlinkBWP-ToAddModList), and a list of BWPs to be released (downlinkBWP-ToReleaseList) may be included. The list of BWP configurations of type BWP downlink (downlinkBWP-ToAddModList) may correspond to a configuration for configuring the dedicated (UE specific) parameters of a downlink BWP (BWP-DownlinkDedicated). The configuration for configuring the dedicated (UE specific) parameters of a downlink BWP (BWP-DownlinkDedicated) may include a PDCCH configuration (pdcch-Config). The PDCCH configuration (pdcch-Config) may include a list of UE specifically configured Control Resource Sets (CORESETs) to be used by the UE (controlResourceSetToAddModList-r16) and a list of CORESETs to be released by the UE (controlResourceSetToReleaseList-r16). A list of CORESETs may be represented in an IE (ControlResourceSet) that may include a CORESET pool index (coresetPoolIndex-r16) and associated CORESET identifier (ID) (controlResourceSetId-r16). The CORESET pool index of value 0 and 1 may be associated with the first TRP and the second TRP, respectively.

Figure 6A:
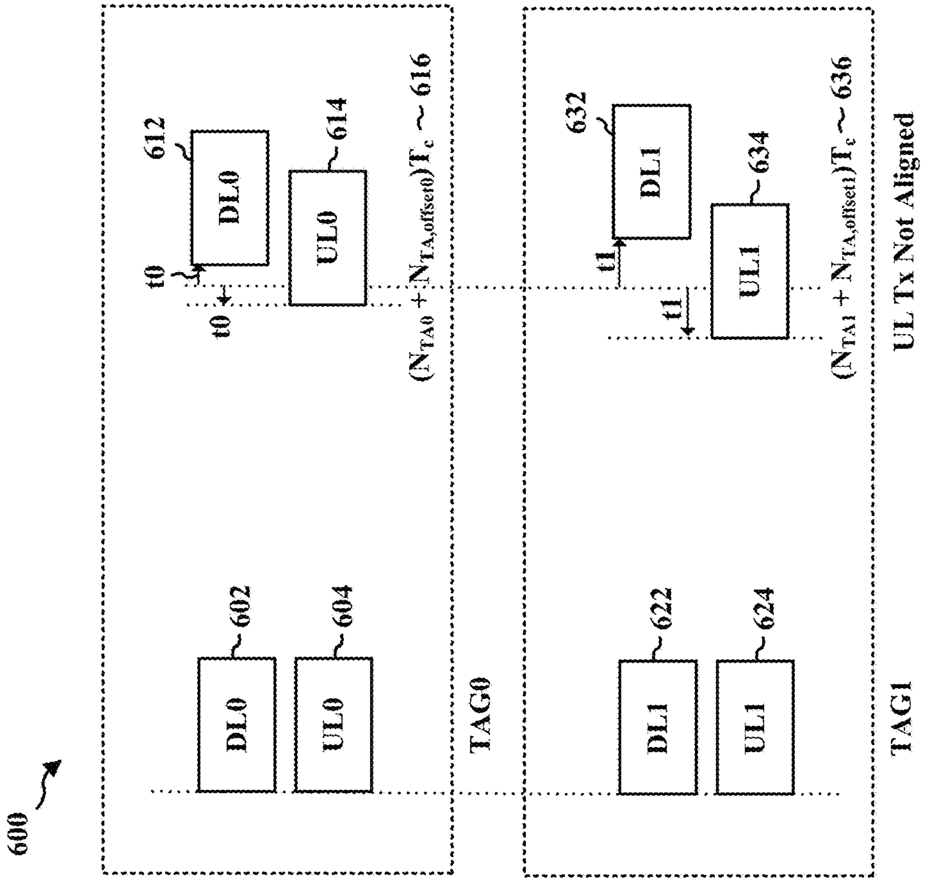
FIG. 6A is a diagram illustrating UL for different TRPs that are not aligned in timing.

A UE may have different UL timing for different multi-downlink control information (mDCI) mTRP schemes. FIG. 6A is a diagram 600 illustrating UL for different TRPs that are not aligned in timing. Transmissions illustrated in FIG. 6A may be originated from a same UE and on different TRPs (e.g., transmitted to different TRPs, which may be also referred to as transmissions associated with different TRPs) of a base station. The UE may be configured with a first TAG (TAG0) that include TA0 and a second TAG (TAG1) that include TA1. The first TAG may be configured for transmissions on the first TRP and the second TAG may be configured for transmissions on the second TRP. As illustrated in FIG. 6A, for a first TAG, without applying TA, a DL reception 602 on the first TAG may be aligned with a UL transmission 604 on the first TAG, a DL reception 622 on a second TAG (TAG1), and a UL transmission 624 on the second TAG. In some aspects, TA0 and TA1 may be different.

After applying TA, a UL transmission 614 on the first TRP may start two times to after a DL reception 612 on the first TRP. The parameter t0 may be calculated based on a timing offset 616 calculated based on TA0 in the first TAG from the TA commands indicated from the network entity. After applying TA, a UL transmission 634 on the second TRP may start two times t1 after a DL reception 632 on the second TRP. The parameter t1 may be calculated based on a timing offset 636 calculated based on TA1 in the second TAG from the TA commands indicated from the network entity. Because TA0 and TA1 may be different, the UL transmission 634 on the second TRP and the UL transmission 614 on the first TRP may not be aligned in timing.

Figure 6B:
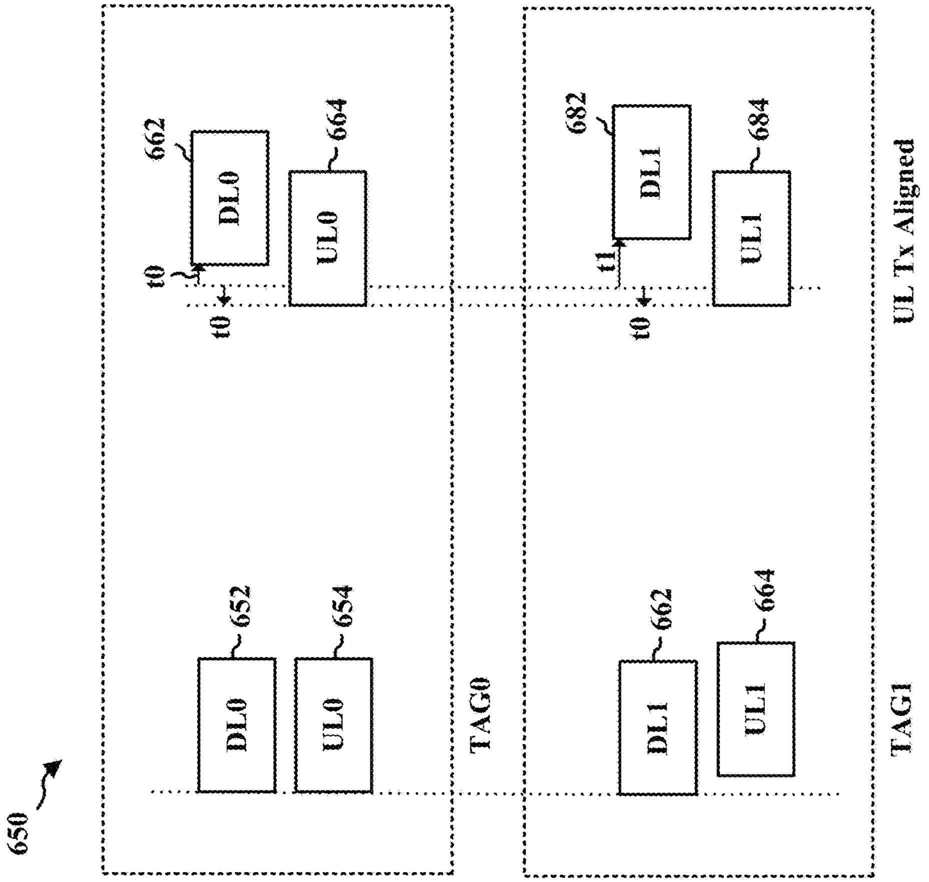
FIG. 6B is a diagram illustrating UL for different TRPs that are aligned in timing.

FIG. 6B is a diagram 650 illustrating UL for different TRPs that are not aligned in timing. Transmissions illustrated in FIG. 6B may be originated from a same UE and on different TRPs (e.g., transmitted to different TRPs, which may be also referred to as transmissions associated with different TRPs) of a base station. The UE may be configured with a first TAG (TAG0) that includes TA0 and a second TAG (TAG1) that includes TA1. The first TAG may be configured for transmissions on the first TRP and the second TAG may be configured for transmissions on the second TRP. As illustrated in FIG. 6B, for a first TAG, without applying TA, a DL reception 652 on the first TAG may be aligned with a UL transmission 654 on the first TAG, a DL reception 662 on a second TAG (TAG1), and a UL transmission 664 on the second TAG. In some aspects, TA0 and TA1 may be different. After applying TA, a UL transmission 664 on the first TRP may start two times to after a DL reception 662 on the first TRP. The parameter t0 may be calculated based on a timing offset calculated based on TA0 in the first TAG.

To align a UL transmission 684 on the second TRP and a UL transmission 664 on the first TRP, after applying TA, the UL transmission 684 on the second TRP may start t0+t1 after a DL reception 682 on the second TRP. In some aspects, the DL reception 662 may be used as a DL timing reference. The parameter t1 may be calculated based on a timing offset 636 calculated based on TA1 in the second TAG. Aligning the UL transmission 664 on the first TRP and the UL transmission 684 on the second TRP may be beneficial (e.g., in reducing interference between TRPs) for simultaneous transmissions.

Uplink inter-TRP interference may degrade mTRP simultaneous transmission. FIG. 7A is a diagram 700 illustrating a TRP0 scheduling. The TRP0 704A may be a first TRP of a base station that may communicate with the UE. The base station may include a second TRP (TRP1 704B) that may communicate with the UE. As illustrated in FIG. 7A, in a first time instance, a UL transmission 702 for TRP0 704A may be based on a first TA (TA0). The UL transmission 702 may be scheduled by the TRP0 704A. FIG. 7B is a diagram 730 illustrating a TRP1 scheduling. The TRP0 734A in FIG. 7B may correspond to the TRP0 704A in FIG. 7A and the TRP1 734B in FIG. 7B may correspond to the TRP0 704B in FIG. 7A. As illustrated in FIG. 7B, in a second time instance, a UL transmission 732 for TRP1 734B may be based on a second TA (TA1). The UL transmission 732 may be scheduled by the TRP1 734B. The TRP1 may co-schedule with other UEs.

FIG. 7C is a diagram 750 illustrating a mTRP scheduling. The TRP0 754A in FIG. 7C may correspond to the TRP0 704A in FIG. 7A and the TRP1 754B in FIG. 7C may correspond to the TRP0 704B in FIG. 7A. As illustrated in FIG. 7C, in a third time instance, a UL transmission 752A for TRP0 754A may be based on a first TA (TA0) and a UL transmission 752B for TRP1 754B may be based on a second TA (TA0). The UL transmission 752A and the UL transmission 752B may be multiplexed based on space division multiplexing (SDM) and thus may be simultaneous transmissions (e.g., scheduled for a same slot or symbol). Because the UL transmission 752A and the UL transmission 752B may not be aligned due to the difference between the first TA and the second TA, the inter-TRP interference may be large.

FIG. 7D is a diagram 770 illustrating another example of mTRP scheduling different from FIG. 7C. The TRP0 774A in FIG. 7D may correspond to the TRP0 704A in FIG. 7A and the TRP1 774B in FIG. 7D may correspond to the TRP0 704B in FIG. 7A. As illustrated in FIG. 7D, in the third time instance, a UL transmission 772A for TRP0 774A may be based on a first TA (TA0) and a UL transmission 772B for TRP1 774B may be based on a second TA (TA0). The UL transmission 772A and the UL transmission 772B may be multiplexed based on frequency division multiplexing (FDM) and thus may be simultaneous transmissions (e.g., scheduled for a same slot or symbol). Because the UL transmission 772A and the UL transmission 772B may not be aligned due to the difference between the first TA and the second TA, the inter-TRP interference may be large.

To reduce inter-TRP interference for simultaneous transmissions, transmissions for FDM based on SDM based PUSCHs for different TRPs may be aligned. In addition, DM-RS for overlapping PUSCHs of different TRPs may be aligned. For example, the number of front-loaded DM-RS symbol(s), the number of DM-RS symbol(s), the DM-RS symbol location, and DM-RS configuration type may be aligned to be the same for overlapping PUSCHs.

Figure 8:
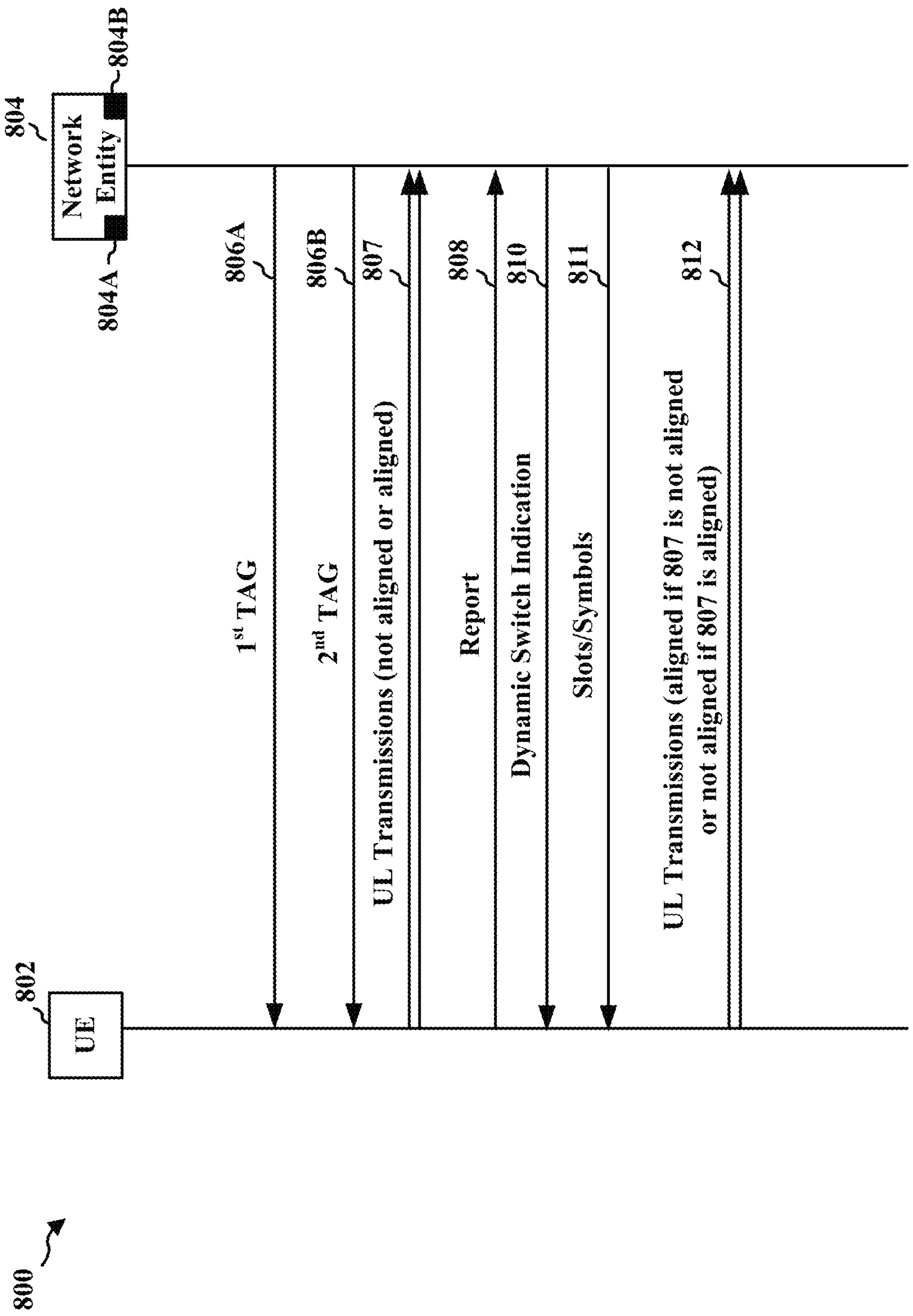
FIG. 8 is a diagram illustrating example communications between a network entity and a UE.

Example aspects provided herein support using multiple TAs for mDCI and mTRP and support dynamic switch between aligning UL transmissions for multiple TRPs and not aligning multiple transmissions. In some aspects, UE capable of mDCI mTRP operation can be dynamically switched between two different UL timing cases: UL transmission (TX) for two or more TRPs being not aligned at the UE or UL TX for two or more TRPs being aligned at the UE. FIG. 8 is a diagram 800 illustrating example communications between a network entity 804 and a UE 802. In some aspects, the UE 802 may correspond to the UE transmitting in FIGS. 6A-6B and the network entity 804 may correspond to the network entity receiving in FIGS. 6A-6B. The network entity 804 may be a network node. A network node may be implemented as an aggregated base station, a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. In some aspects, the network entity 804 may include a first TRP 804A and a second TRP 804B.

As illustrated in FIG. 8, the UE 802 may receive, from the network entity 804, a first TAG 806A that may be associated with a first TA (e.g., associated with the TRP 804A). The UE 802 may also receive, from the network entity 804, a second TAG 806B that may be associated with a second TA (e.g., associated with the TRP 804B). In some aspects, the UE 802 may transmit UL transmissions 807 that may include two simultaneous or non-simultaneous UL transmissions-a first UL transmission for the first TRP 804A and a second UL transmission for the second TRP 804B. In some aspects, the first UL transmission and the second UL transmission in the UL transmissions 807 are not aligned. For example, the first TA associated with the first TAG 806A and the second TA associated with the second TAG 806B may be independently applied for the first TRP 804A and the second TRP 804B.

In some aspects, the first UL transmission and the second UL transmission in the UL transmissions 807 are aligned. To align the first UL transmission and the second UL transmission, in some aspects, one TA (e.g., either the first TA associated with the first TAG 806A or the second TA associated with the second TAG 806B) may be applied for the first TRP 804A and the second TRP 804B. For example, one of the first TAG 806A or the second TAG 806B may be applied. The one of the first TAG 806A or the second TAG 806B that may be applied may be either signaled by the network entity 804 or a default TAG applied by the UE 802.

In some aspects, to align the first UL transmission and the second UL transmission, the first TAG 806A and the second TAG 806B may include a per-TRP offset to align the UL transmissions. The per-TRP offset may be applied or not applied based on a dynamic switch (e.g., dynamic switch indication 810).

In some aspects, the UE 802 may receive a dynamic switch indication 810 from the network entity 804 to change UL transmission alignment (e.g., from not aligned to aligned or from aligned to not aligned). For example, if the first UL transmission and the second UL transmission in the UL transmissions 807 are not aligned, after receiving the dynamic switch, a first UL transmission for the first TRP 804A and a second UL transmission for the second TRP 804B (that may be non-simultaneous or simultaneous) in the UL transmissions 812 may be aligned. Similarly, if the first UL transmission and the second UL transmission in the UL transmissions 807 are aligned, after receiving the dynamic switch, the first UL transmission for the first TRP 804A and the second UL transmission for the second TRP 804B in the UL transmissions 812 may be not aligned.

Figure 9B:
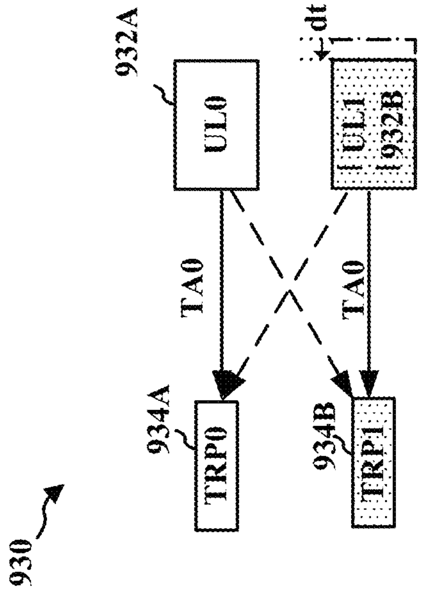
FIG. 9B is a diagram illustrating a UL timing example.
Figure 9A:
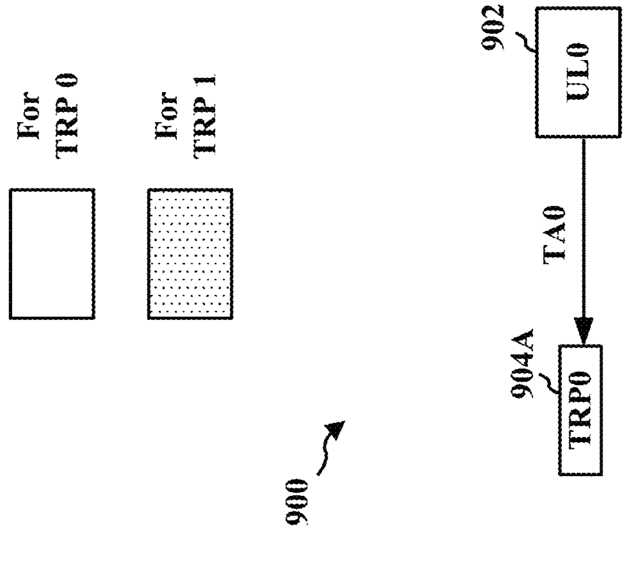
FIG. 9A is a diagram illustrating a UL timing example.

In some aspects, when the UE 802 is configured with two TAGs (e.g., the first TAG 806A and the second TAG 806B) for mDCI mTRP and enabled with simultaneous transmission, the UE may apply different TA timing cases for simultaneous transmissions and non-simultaneous transmissions. In some aspects, for non-simultaneous transmissions, the UE 802 may apply a TAG to a UL based on the associated TRP. For example, the UE 802 may apply the TAG 806A to an uplink transmission to the first TRP 804A and the UE 802 may apply the TAG 806B to an uplink transmission to the second TRP 804B. FIG. 9A is a diagram 900 illustrating a UL timing example. As illustrated in FIG. 9A, a first TA (TA0) may be applied for a UL transmission 902 to the first TRP 904A (TRP0).

In some aspects, for simultaneous transmissions, the UE 802 may apply one TAG (and associated DL reference timing) for simultaneous UL transmissions associated with different TRPs (e.g., the first TRP 804A and the second TRP 804B). For example, the UE 802 may apply a default TAG (e.g., a TAG of lower ID, or a TAG associated with lower CORESET pool index) to simultaneous UL transmissions associated with different TRPs. FIG. 9B is a diagram 930 illustrating a UL timing example. As illustrated in FIG. 9B, a first TA (TA0) may be applied for a UL transmission 932A to a first TRP 934A (TRP0) and a simultaneous UL transmission 932B to a second TRP 934B (TRP1).

In some aspects, when the UE 802 is configured with two TAGs for mDCI mTRP and enabled with simultaneous transmission, the UE 802 may apply different TA timing cases for simultaneous transmissions and non-simultaneous transmissions in different set of slots or symbols. For example, the UE 802 may be indicated with a first set of time occasions (e.g., slots/mini slots or symbols) available for non-simultaneous transmission (and not available for simultaneous transmission) and also a second set of time occasions (e.g., slots/mini slots or symbols) available for simultaneous transmissions, by MAC-CE or DCI (e.g., in slots/symbols 811). In some aspects, for slots or symbols available for non-simultaneous transmissions (which may be not available for simultaneous transmissions), UE may apply a TAG (e.g., the first TAG 806A and the second TAG 806B and associated DL reference timing) to the UL based on the associated TRP (e.g., the first TRP 804A or the second TRP 804B). In some aspects, the UE 802 may apply the first TAG 806A to a first UL transmission to the first TRP 804A and apply the TAG 806B to a second UL transmission to the second TRP 804B. For slots available for simultaneous transmissions (which may be not available for non-simultaneous transmissions), the UE 802 may apply one TAG (e.g., the first TAG 806A or the second TAG 806B and associated DL reference timing) for ULs associated with different TRPs (e.g., the first TRP 804A or the second TRP 804B). The slots available for simultaneous transmissions (which may be not available for non-simultaneous transmissions) may also be scheduled with non-simultaneous transmissions. In some aspects, the UE 802 may apply a default TAG, a TAG of lower ID, a TAG associated with lower CORESET pool index (e.g., among the first TAG 806A or the second TAG 806B).

Figures 10A, 10B, 10C:
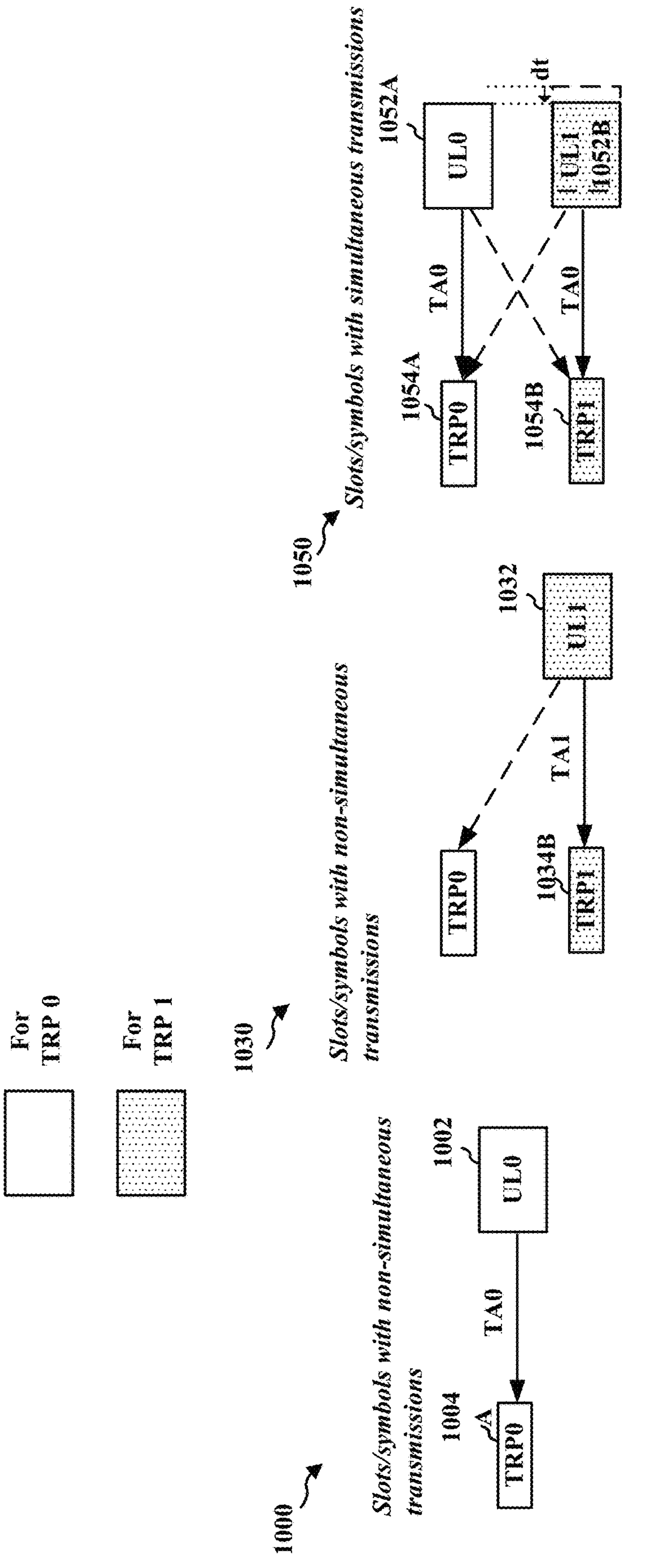
FIG. 10A is a diagram illustrating a UL timing example.
FIG. 10B is a diagram illustrating a UL timing example.
FIG. 10C is a diagram illustrating a UL timing example.

FIG. 10A is a diagram 1000 illustrating a UL timing example. As illustrated in FIG. 10A, a first TA (TA0) may be applied for a UL transmission 1002 to the first TRP 1004A (TRP0) for slots/symbols available for non-simultaneous transmissions (which may be not available for simultaneous transmissions).

FIG. 10B is a diagram 1030 illustrating a UL timing example. As illustrated in FIG. 10B, a second TA (TA1) may be applied for a UL transmission 1032 to the second TRP 1034B (TRP1) for slots/symbols available for non-simultaneous transmissions (which may be not available for simultaneous transmissions).

FIG. 10C is a diagram 1050 illustrating a UL timing example. As illustrated in FIG. 10C, a first TA (TA0) may be applied for a UL transmission 1052A to a first TRP 1054A (TRP0) and a UL transmission 1052B to a first TRP 1054B (TRP1). The first TA (TA0) may be a default TAG, a TAG of lower ID or a TAG associated with lower CORESET pool index.

In some aspects, the UE 802 may report to the network entity 804 (e.g., in a report 808) that whether UL TX alignment may be used (e.g., for simultaneous operation of mDCI mTRP). In some aspects, the report 808 and whether UL TX alignment may be used may be based on UL channel waveform (e.g., discrete Fourier transform spread OFDM (DFT-s-OFDM) or cyclic prefix OFDM (CP-OFDM)). In some aspects, the report 808 and whether UL TX alignment may be used may be based on a UE capability or a dynamic UE report associated with the UE 802. In some aspects, the UE 802 may be indicated with a set of timing occasions that may be applied with different UL timing cases (e.g., in the dynamic switch indication 810). In some aspects, the dynamic switch indication 810 may be based on MAC-CE or DCI. In some aspects, the timing occasions may be defined based on slots or symbols.

In some aspects, the UE 802 may be configured with guard symbols between the transitions of different UL timing cases. In some aspects, the set of guard symbols may be indicated by MAC-CE. The guard symbols may be applied for one or more of: switching between a first UL TRP (e.g., 804A) and a second UL TRP (e.g., 804B), switching between a second UL TRP (e.g., 804B) and a first DL TRP (e.g., 804A), or switching between a first UL TRP (e.g., 804A) and a second DL TRP (e.g., 804B). In some aspects, the UE may report (e.g., in the report 808), a minimum number of guard symbols for different switching cases.

Figure 11:
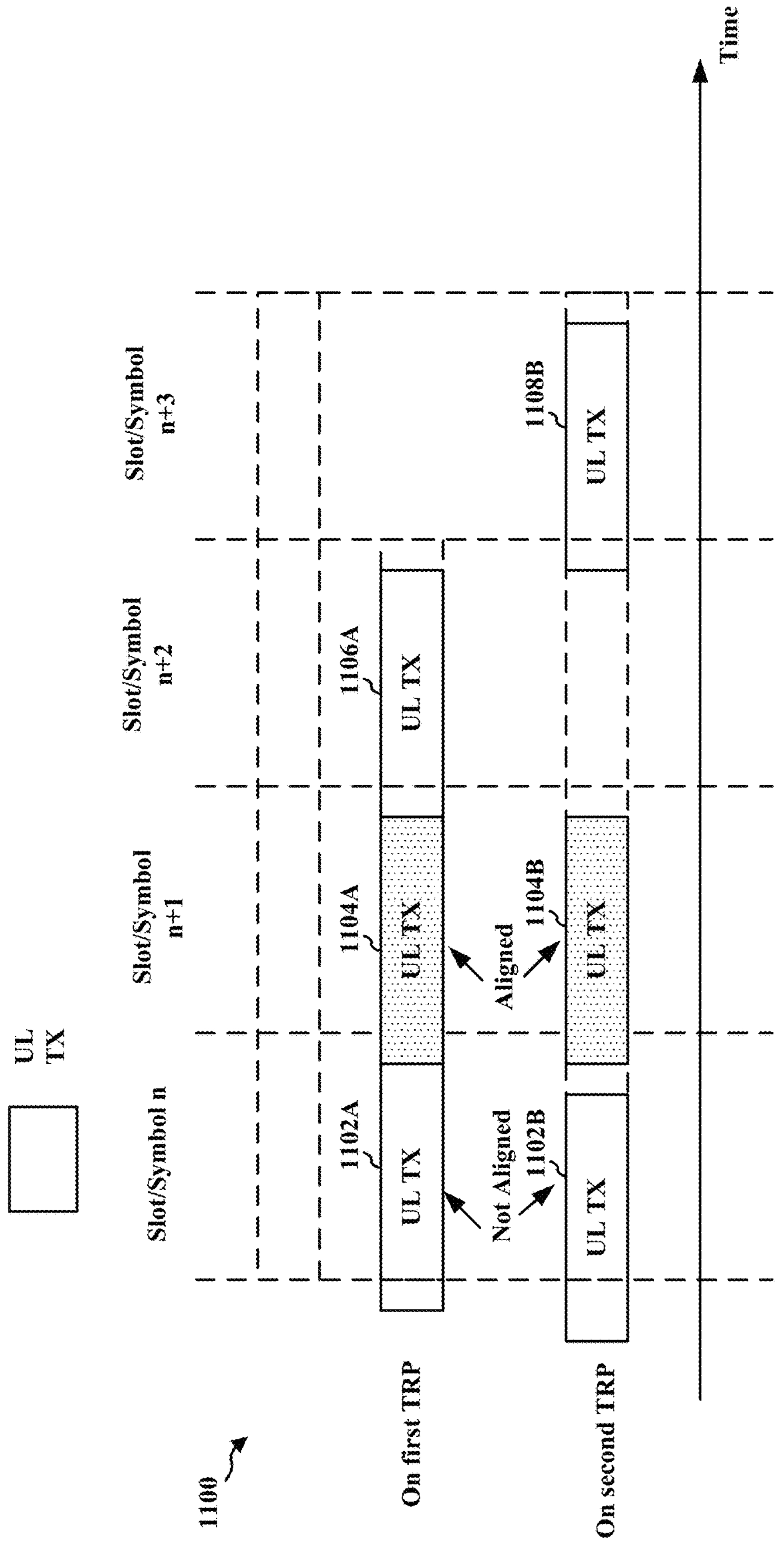
FIG. 11 is a diagram illustrating example of switching between UL alignment or UL non-alignment.

FIG. 11 is a diagram 1100 illustrating example of switching between UL alignment or UL non-alignment. As illustrated in FIG. 11, in a first slot or symbol n, a first UL transmission 1102A for a first TRP may not be aligned with a first UL transmission 1102B for a second TRP. In a second slot or symbol n+1, a second UL transmission 1104A for the first TRP may be aligned with a second UL transmission 1104B for the second TRP. A following UL transmission 1106A in a third slot or symbol n+2 for the first TRP may follow the same alignment. Similarly, a following UL transmission 1108B in a fourth slot or symbol n+3 for the second TRP may follow the same alignment.

Figure 12:
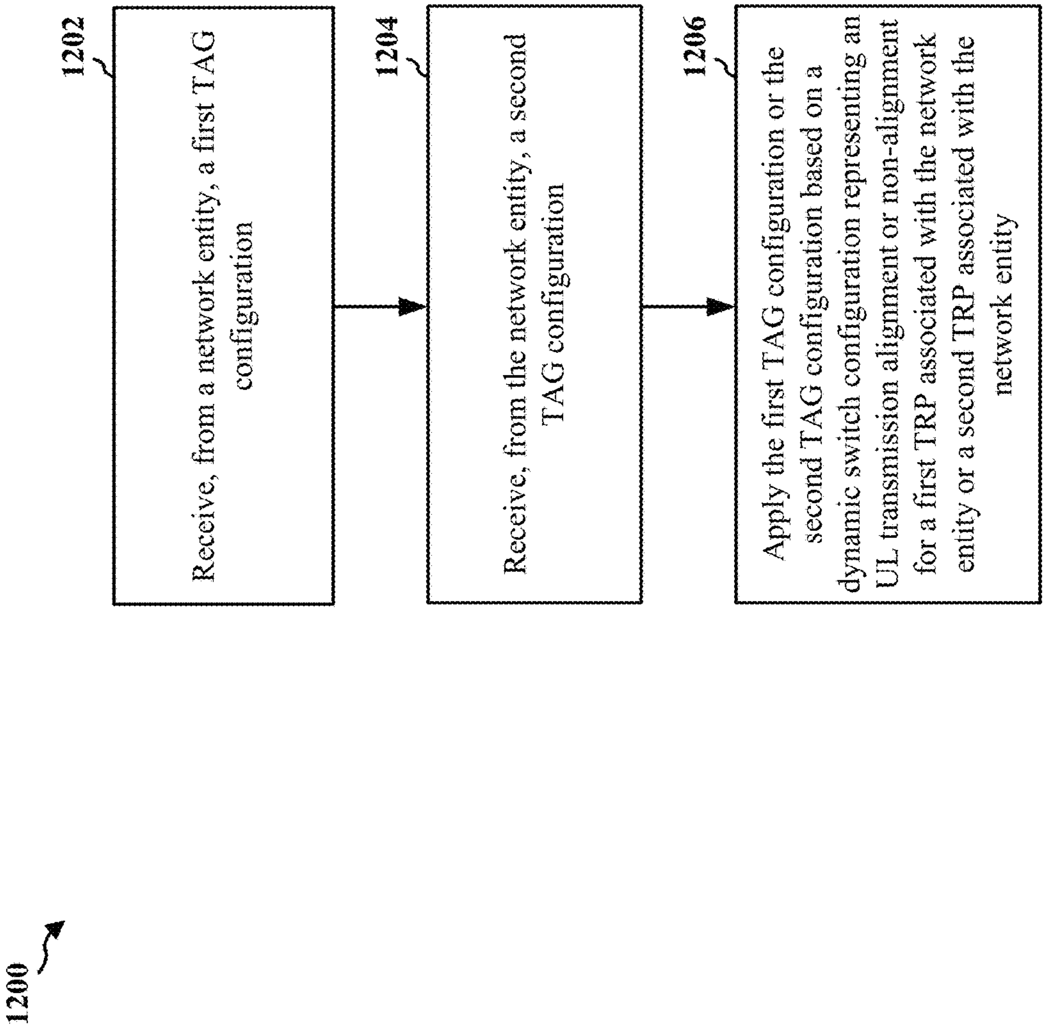
FIG. 12 is a flowchart of a method of wireless communication.

FIG. 12 is a flowchart 1200 of a method of wireless communication. The method may be performed by a UE (e.g., the UE 104, the UE 802; the apparatus 1604).

At 1202, the UE may receive, from a network entity, a first TAG configuration. For example, the UE 802 may receive, from a network entity 804, a first TAG configuration (e.g., the TAG 806A). Further, 1202 may be performed by alignment component 198.

At 1204, the UE may receive, from the network entity, a second TAG configuration. For example, the UE 802 may receive, from the network entity 804, a second TAG configuration (e.g., the TAG 806B). Further, 1204 may be performed by alignment component 198.

At 1206, the UE may apply the first TAG configuration or the second TAG configuration based on a dynamic switch configuration representing a UL transmission alignment or non-alignment for a first TRP associated with the network entity or a second TRP associated with the network entity. For example, the UE 802 may apply the first TAG configuration or the second TAG configuration based on a dynamic switch configuration representing a UL transmission alignment or non-alignment for a first TRP associated with the network entity or a second TRP associated with the network entity for the UL transmissions 812 or 807. Further, 1206 may be performed by alignment component 198.

Figure 13:
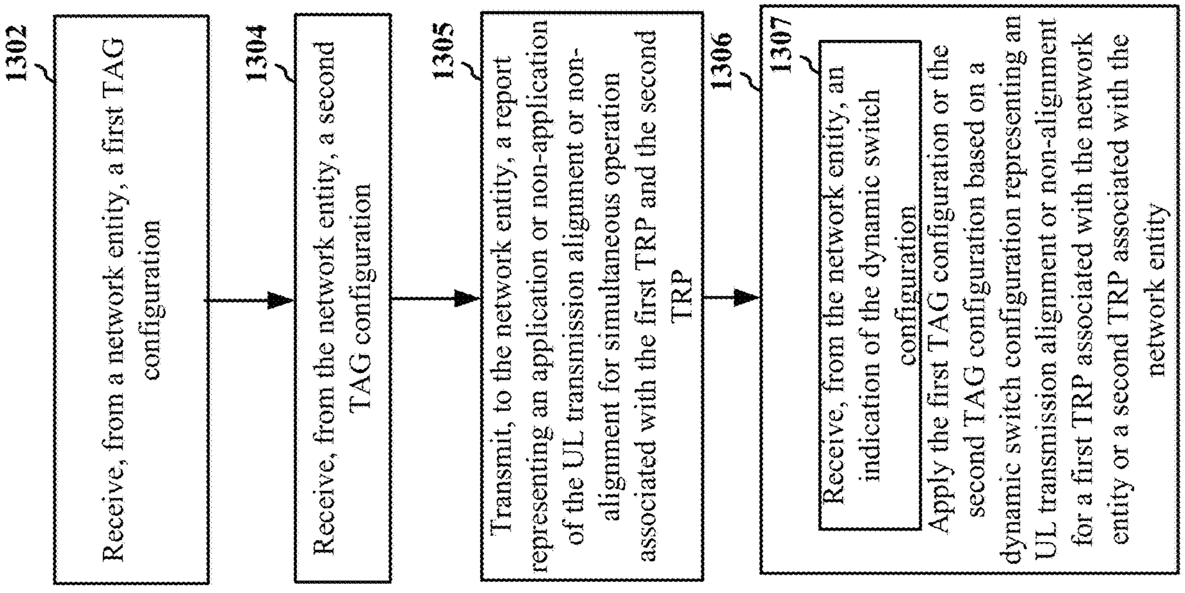
FIG. 13 is a flowchart of a method of wireless communication.

FIG. 13 is a flowchart 1300 of a method of wireless communication. The method may be performed by a UE (e.g., the UE 104, the UE 802; the apparatus 1604).

At 1302, the UE may receive, from a network entity, a first TAG configuration. For example, the UE 802 may receive, from a network entity 804, a first TAG configuration (e.g., the TAG 806A). Further, 1302 may be performed by alignment component 198.

At 1304, the UE may receive, from the network entity, a second TAG configuration. For example, the UE 802 may receive, from the network entity 804, a second TAG configuration (e.g., the TAG 806B). Further, 1304 may be performed by alignment component 198.

At 1305, the UE may transmit, to the network entity, a report representing an application or non-application of the UL transmission alignment or non-alignment for simultaneous operation associated with the first TRP and the second TRP. For example, the UE 802 may transmit, to the network entity 804, a report 808 representing an application or non-application of the UL transmission alignment or non-alignment for simultaneous operation associated with the first TRP and the second TRP. Further, 1305 may be performed by alignment component 198. In some aspects, the report may be based on a capability associated with the UE or a dynamic reporting, and where the report may be based on a UL channel waveform. In some aspects, the report may represent the application of the UL transmission alignment or non-alignment, and the dynamic switch configuration may be based on the report and may represent applying one of the first TAG configuration or the second TAG configuration for both the first TRP and the second TRP or applying a TRP-specific TA offset in the first TAG configuration or the second TAG configuration. In some aspects, the report may represent the non-application of the UL transmission alignment or non-alignment, and the dynamic switch configuration may be based on the report and may represent applying the first TAG configuration for the first TRP and applying the second TAG configuration for the second TRP or not applying a TRP-specific TA offset in the first TAG configuration or the second TAG configuration.

At 1306, the UE may apply the first TAG configuration or the second TAG configuration based on a dynamic switch configuration representing a UL transmission alignment or non-alignment for a first TRP associated with the network entity or a second TRP associated with the network entity. For example, the UE 802 may apply the first TAG configuration or the second TAG configuration based on a dynamic switch configuration representing a UL transmission alignment or non-alignment for a first TRP associated with the network entity or a second TRP associated with the network entity for the UL transmissions 812 or 807. Further, 1306 may be performed by alignment component 198. In some aspects, the dynamic switch configuration may represent applying the first TAG configuration for the first TRP and applying the second TAG configuration for the second TRP.

In some aspects, the dynamic switch configuration may represent applying one of the first TAG configuration or the second TAG configuration for both the first TRP and the second TRP. In some aspects, the one of the first TAG configuration or the second TAG configuration may be defined in the dynamic switch configuration. In some aspects, the one of the first TAG configuration or the second TAG configuration may be a default TAG configuration. In some aspects, the first TAG configuration or the second TAG configuration may include a TRP-specific TA offset associated with the first TRP or the second TRP.

In some aspects, as part of 1306, at 1307, the UE may receive, from the network entity, an indication of the dynamic switch configuration representing the UL transmission alignment or non-alignment for the first TRP associated with the network entity or the second TRP associated with the network entity. For example, the UE 802 may receive, from the network entity 804, an indication of the dynamic switch configuration (e.g., dynamic switch indication 810) representing the UL transmission alignment or non-alignment for the first TRP associated with the network entity or the second TRP associated with the network entity. Further, 1307 may be performed by alignment component 198.

In some aspects, the dynamic switch configuration may be based on MAC-CE or DCI. In some aspects, the dynamic switch configuration may represent applying the first TAG configuration or the second TAG configuration for one or more slots or one or more symbols. In some aspects, the dynamic switch configuration may be associated with one or more guard symbols for the first TAG configuration or the second TAG configuration for the first TRP or the second TRP.

FIG. 14 is a flowchart 1400 of a method of wireless communication. The method may be performed by a network entity (e.g., the base station 102/180, the network entity 804; the network entity 1602).

At 1402, the network entity may transmit a first TAG configuration for a UE. For example, the network entity 804 may transmit a first TAG configuration (e.g., the TAG 806A) for a UE 802. Further, 1402 may be performed by alignment component 199.

At 1404, the network entity may transmit a second TAG configuration for the UE. For example, the network entity 804 may transmit a second TAG configuration (e.g., the TAG 806B) for the UE 802. Further, 1404 may be performed by alignment component 199.

At 1406, the network entity may transmit an indication of a dynamic switch configuration representing a UL transmission alignment or non-alignment for the UE corresponding to a first TRP associated with the network entity or a second TRP associated with the network entity. The dynamic switch configuration may be associated with an application of the first TAG configuration or the second TAG configuration. For example, the network entity 804 may transmit an indication of a dynamic switch configuration (e.g., the dynamic switch indication 810) representing a UL transmission alignment or non-alignment for the UE corresponding to a first TRP associated with the network entity or a second TRP associated with the network entity. Further, 1406 may be performed by alignment component 199.

Figure 15:
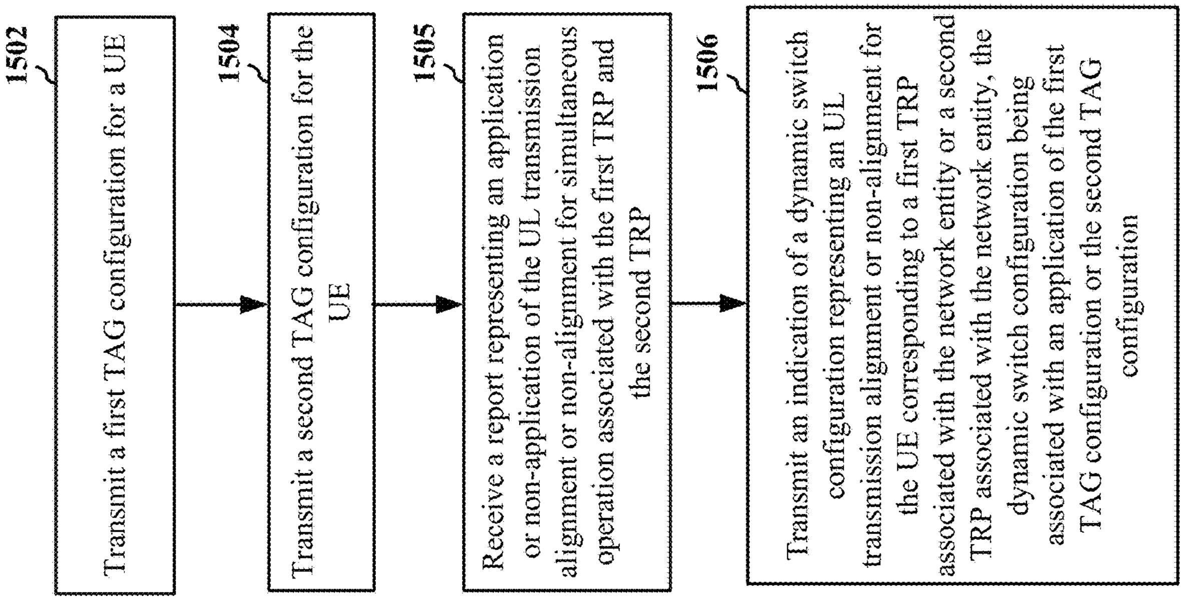
FIG. 15 is a flowchart of a method of wireless communication.

FIG. 15 is a flowchart 1500 of a method of wireless communication. The method may be performed by a network entity (e.g., the base station 102/180, the network entity 804; the network entity 1602).

At 1502, the network entity may transmit a first TAG configuration for a UE. For example, the network entity 804 may transmit a first TAG configuration (e.g., the TAG 806A) for a UE 802. Further, 1502 may be performed by alignment component 199.

At 1504, the network entity may transmit a second TAG configuration for the UE. For example, the network entity 804 may transmit a second TAG configuration (e.g., the TAG 806B) for the UE 802. Further, 1504 may be performed by alignment component 199.

At 1505, the network entity may receive, from the UE, a report representing an application or non-application of the UL transmission alignment or non-alignment for simultaneous operation associated with the first TRP and the second TRP. For example, the network entity 804 may receive, from the UE 802, a report 808 representing an application or non-application of the UL transmission alignment or non-alignment for simultaneous operation associated with the first TRP and the second TRP. Further, 1505 may be performed by alignment component 199. In some aspects, the report may be based on a capability associated with the UE or a dynamic reporting, and where the report may be based on a UL channel waveform. In some aspects, the report may represent the application of the UL transmission alignment or non-alignment, and the dynamic switch configuration may be based on the report and may represent applying one of the first TAG configuration or the second TAG configuration for both the first TRP and the second TRP or applying a TRP-specific TA offset in the first TAG configuration or the second TAG configuration. In some aspects, the report may represent the non-application of the UL transmission alignment or non-alignment, and the dynamic switch configuration may be based on the report and may represent applying the first TAG configuration for the first TRP and applying the second TAG configuration for the second TRP or not applying a TRP-specific TA offset in the first TAG configuration or the second TAG configuration.

At 1506, the network entity may transmit an indication of a dynamic switch configuration representing a UL transmission alignment or non-alignment for the UE corresponding to a first TRP associated with the network entity or a second TRP associated with the network entity. The dynamic switch configuration may be associated with an application of the first TAG configuration or the second TAG configuration. For example, the network entity 804 may transmit an indication of a dynamic switch configuration (e.g., the dynamic switch indication 810) representing a UL transmission alignment or non-alignment for the UE corresponding to a first TRP associated with the network entity or a second TRP associated with the network entity. Further, 1506 may be performed by alignment component 199.

In some aspects, the dynamic switch configuration may represent applying the first TAG configuration for the first TRP and applying the second TAG configuration for the second TRP.

In some aspects, the dynamic switch configuration may represent applying one of the first TAG configuration or the second TAG configuration for both the first TRP and the second TRP. In some aspects, the one of the first TAG configuration or the second TAG configuration may be defined in the dynamic switch configuration. In some aspects, the one of the first TAG configuration or the second TAG configuration may be a default TAG configuration. In some aspects, the first TAG configuration or the second TAG configuration may include a TRP-specific TA offset associated with the first TRP or the second TRP.

In some aspects, the dynamic switch configuration may be based on MAC-CE or DCI. In some aspects, the dynamic switch configuration may represent applying the first TAG configuration or the second TAG configuration for one or more slots or one or more symbols. In some aspects, the dynamic switch configuration may be associated with one or more guard symbols for the first TAG configuration or the second TAG configuration for the first TRP or the second TRP.

Figure 16:
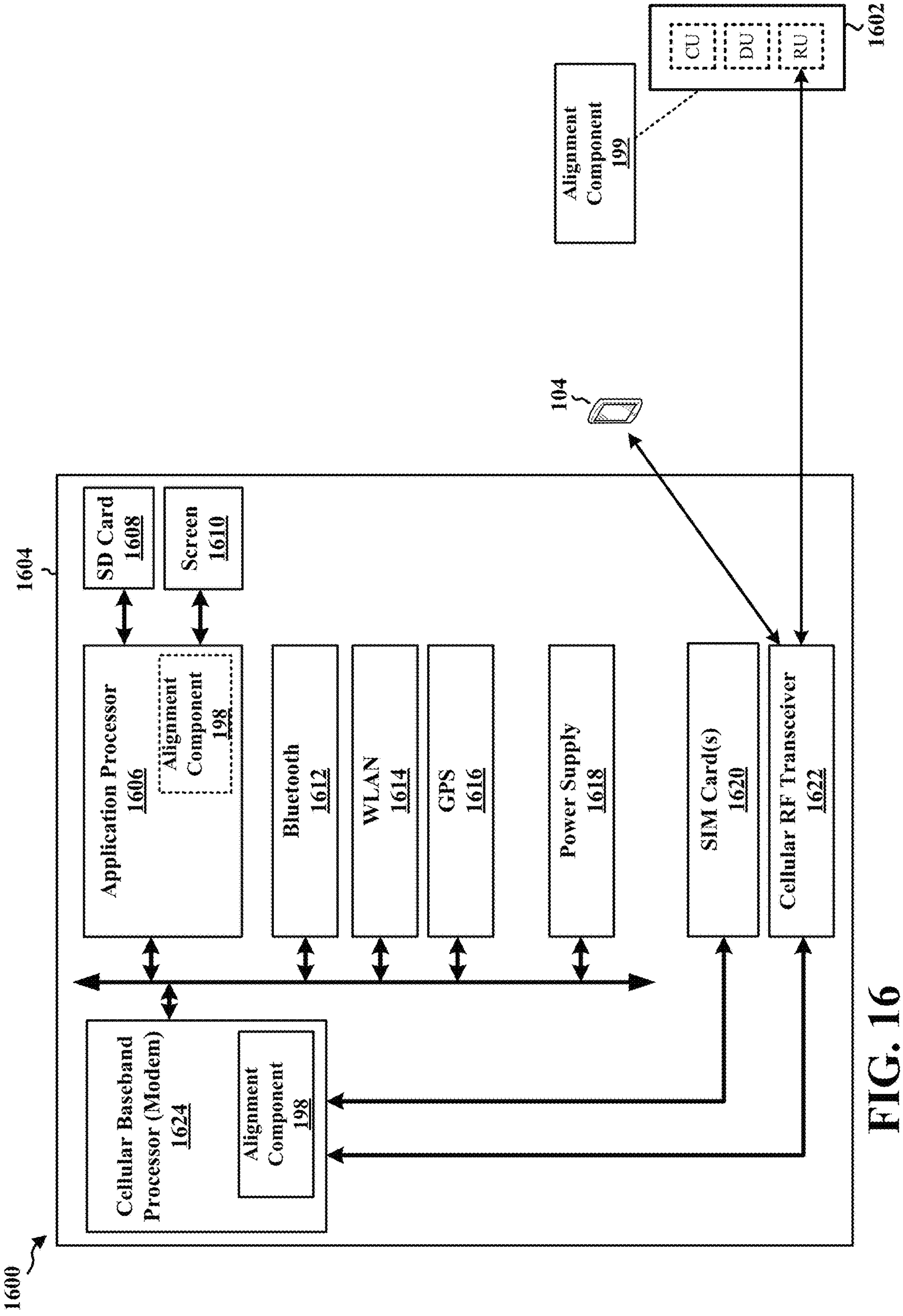
FIG. 16 is a diagram illustrating an example of a hardware implementation for an example apparatus.

FIG. 16 is a diagram 1600 illustrating an example of a hardware implementation for an apparatus 1604 and a network entity 1602. The apparatus 1604 may be a UE, a component of a UE, or may implement UE functionality. The network entity 1602 may be a BS, a component of a BS, or may implement BS functionality. In some aspects, the apparatus 1604 may include a cellular baseband processor 1624 (also referred to as a modem) coupled to a cellular RF transceiver 1622. In some aspects, the apparatus 1604 may further include one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, or a power supply 1618. The cellular baseband processor 1624 communicates through the cellular RF transceiver 1622 with the UE 104 and/or with an RU associated with the network entity 1602. The RU is either part of the network entity 1602 or is in communication with the network entity 1602. The network entity 1602 may include one or more of the CU, DU, and the RU. The cellular baseband processor 1624 and the application processor 1606 may each include a computer-readable medium/memory. Each computer-readable medium/memory may be non-transitory. The cellular baseband processor 1624 and the application processor 1606 are each responsible for general processing, including the execution of software stored on the computer-readable medium/memory. The software, when executed by the cellular baseband processor 1624/application processor 1606, causes the cellular baseband processor 1624/application processor 1606 to perform the various functions described supra. The computer-readable medium/memory may also be used for storing data that is manipulated by the cellular baseband processor 1624/application processor 1606 when executing software. The cellular baseband processor 1624/application processor 1606 may be a component of the UE 350 and may include the memory 360 and/or at least one of the TX processor 368, the RX processor 356, and the controller/processor 359. In one configuration, the apparatus 1604 may be a processor chip (modem and/or application) and include just the cellular baseband processor 1624 and/or the application processor 1606, and in another configuration, the apparatus 1604 may be the entire UE (e.g., see 350 of FIG. 3) and include the additional modules of the apparatus 1604.

As discussed supra, in some aspects, the alignment component 198 may be configured to receive, from a network entity, a first TAG configuration. In some aspects, the alignment component 198 may be further configured to receive, from the network entity, a second TAG configuration. In some aspects, the alignment component 198 may be further configured to apply the first TAG configuration or the second TAG configuration based on a dynamic switch configuration representing a UL transmission alignment or non-alignment for a first TRP associated with the network entity or a second TRP associated with the network entity. The alignment component 198 may be within the cellular baseband processor 1624, the application processor 1606, or both the cellular baseband processor 1624 and the application processor 1606. The alignment component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1604 may include a variety of components configured for various functions. In one configuration, the apparatus 1604, and in particular the cellular baseband processor 1624 and/or the application processor 1606, includes means for receiving, from a network entity, a first TAG configuration. In some aspects, the cellular baseband processor 1624 and/or the application processor 1606 may include means for receiving, from the network entity, a second TAG configuration. In some aspects, the cellular baseband processor 1624 and/or the application processor 1606 may include means for applying the first TAG configuration or the second TAG configuration based on a dynamic switch configuration representing a UL transmission alignment or non-alignment for a first TRP associated with the network entity or a second TRP associated with the network entity. In some aspects, the cellular baseband processor 1624 and/or the application processor 1606 may include means for receiving, from the network entity, an indication of the dynamic switch configuration representing the UL transmission alignment or non-alignment for the first TRP associated with the network entity or the second TRP associated with the network entity. In some aspects, the cellular baseband processor 1624 and/or the application processor 1606 may include means for transmitting, to the network entity, a report representing an application or non-application of the UL transmission alignment or non-alignment for simultaneous operation associated with the first TRP and the second TRP. The means may be the alignment component 198 of the apparatus 1604 configured to perform the functions recited by the means. As described supra, the apparatus 1604 may include the TX processor 368, the RX processor 356, and the controller/processor 359. As such, in one configuration, the means may be the TX processor 368, the RX processor 356, and/or the controller/processor 359 configured to perform the functions recited by the means.

As discussed supra, the alignment component 199 may be configured to transmit a first TAG configuration for a UE. In some aspects, the alignment component 199 may be further configured to transmit a second TAG configuration for the UE. In some aspects, the alignment component 199 may be further configured to transmit an indication of a dynamic switch configuration representing a UL transmission alignment or non-alignment for the UE corresponding to a first TRP associated with the network entity or a second TRP associated with the network entity, the dynamic switch configuration may be associated with an application of the first TAG configuration or the second TAG configuration. The alignment component 199 may be within one or more processors (e.g., BBU(s)) of one or more of the CU, DU, and the RU. The alignment component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for transmitting a first TAG configuration for a UE. The network entity 1602 may further include means for transmitting a second TAG configuration for the UE. The network entity 1602 may further include means for transmitting an indication of a dynamic switch configuration representing a UL transmission alignment or non-alignment for the UE corresponding to a first TRP associated with the network entity or a second TRP associated with the network entity, the dynamic switch configuration may be associated with an application of the first TAG configuration or the second TAG configuration. The network entity 1602 may further include means for receiving a report representing an application or non-application of the UL transmission alignment or non-alignment for simultaneous operation associated with the first TRP and the second TRP. The means may be the alignment component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is a method for communication at a user equipment (UE), including: receiving, from a network entity, a first timing advance (TA) group (TAG) configuration; receiving, from the network entity, a second TAG configuration; and applying the first TAG configuration or the second TAG configuration based on a dynamic switch configuration representing an uplink (UL) transmission alignment or non-alignment for a first transmission reception point (TRP) associated with the network entity or a second TRP associated with the network entity.

Aspect 2 is the method of aspect 1, further including: receiving, from the network entity, an indication of the dynamic switch configuration representing the UL transmission alignment or non-alignment for the first TRP associated with the network entity or the second TRP associated with the network entity.

Aspect 3 is the method of any of aspects 1-2, where the dynamic switch configuration may represent applying the first TAG configuration for the first TRP and applying the second TAG configuration for the second TRP.

Aspect 4 is the method of any of aspects 1-3, where the dynamic switch configuration may represent applying one of the first TAG configuration or the second TAG configuration for both the first TRP and the second TRP.

Aspect 5 is the method of any of aspects 1-4, where the one of the first TAG configuration or the second TAG configuration may be defined in the dynamic switch configuration.

Aspect 6 is the method of any of aspects 1-4, where the one of the first TAG configuration or the second TAG configuration may be a default TAG configuration.

Aspect 7 is the method of any of aspects 1-4, where the first TAG configuration or the second TAG configuration may include a TRP-specific TA offset associated with the first TRP or the second TRP.

Aspect 8 is the method of any of aspects 1-7, further including: transmitting, to the network entity, a report representing an application or non-application of the UL transmission alignment or non-alignment for simultaneous operation associated with the first TRP and the second TRP.

Aspect 9 is the method of any of aspects 1-8, where the report may be based on a capability associated with the UE or a dynamic reporting, and where the report may be based on a UL channel waveform.

Aspect 10 is the method of any of aspects 1-9, where the report may represent the application of the UL transmission alignment or non-alignment, and where the dynamic switch configuration may be based on the report and may represent applying one of the first TAG configuration or the second TAG configuration for both the first TRP and the second TRP or applying a TRP-specific TA offset in the first TAG configuration or the second TAG configuration.

Aspect 11 is the method of any of aspects 1-9, where the report may represent the non-application of the UL transmission alignment or non-alignment, and where the dynamic switch configuration may be based on the report and may represent applying the first TAG configuration for the first TRP and applying the second TAG configuration for the second TRP or not applying a TRP-specific TA offset in the first TAG configuration or the second TAG configuration.

Aspect 12 is the method of any of aspects 1-11, where the dynamic switch configuration may be based on a medium access control (MAC) control element (MAC-CE) or downlink control information (DCI).

Aspect 13 is the method of any of aspects 1-12, where the dynamic switch configuration may represent applying the first TAG configuration or the second TAG configuration for one or more slots or one or more symbols.

Aspect 14 is the method of any of aspects 1-13, where the dynamic switch configuration may be associated with one or more guard symbols for the first TAG configuration or the second TAG configuration for the first TRP or the second TRP.

Aspect 15 is a method of communication at a network entity, including: transmitting a first TAG configuration for a UE; transmitting a second TAG configuration for the UE; and transmitting an indication of a dynamic switch configuration representing a UL transmission alignment or non-alignment for the UE corresponding to a first TRP associated with the network entity or a second TRP associated with the network entity, the dynamic switch configuration being associated with an application of the first TAG configuration or the second TAG configuration.

Aspect 16 is the method of aspect 15, where the dynamic switch configuration may represent applying the first TAG configuration for the first TRP and applying the second TAG configuration for the second TRP.

Aspect 17 is the method of any of aspects 15-16, where the dynamic switch configuration may represent applying one of the first TAG configuration or the second TAG configuration for both the first TRP and the second TRP.

Aspect 18 is the method of any of aspects 15-17, where the one of the first TAG configuration or the second TAG configuration may be a default TAG configuration may be defined in the dynamic switch configuration.

Aspect 19 is the method of any of aspects 15-17, where the one of the first TAG configuration or the second TAG configuration may be a default TAG configuration.

Aspect 20 is the method of any of aspects 15-17, where the first TAG configuration or the second TAG configuration may include a TRP-specific TA offset associated with the first TRP or the second TRP.

Aspect 21 is the method of any of aspects 15-20, where the at least one processor coupled to the memory may be further configured to: receive a report representing the application of the UL transmission alignment or non-alignment or a non-application of the UL transmission alignment or non-alignment for simultaneous operation associated with the first TRP and the second TRP.

Aspect 22 is the method of any of aspects 15-21, where the report may be based on a capability associated with the UE or a dynamic reporting, and where the report may be based on a UL channel waveform.

Aspect 23 is the method of any of aspects 15-22, where the report may represent the application of the UL transmission alignment or non-alignment, and where the dynamic switch configuration may be based on the report and may represent applying one of the first TAG configuration or the second TAG configuration for both the first TRP and the second TRP or applying a TRP-specific TA offset in the first TAG configuration or the second TAG configuration.

Aspect 24 is the method of any of aspects 15-22, where the report may represent the non-application of the UL transmission alignment or non-alignment, and where the dynamic switch configuration may be based on the report and may represent applying the first TAG configuration for the first TRP and applying the second TAG configuration for the second TRP or not applying a TRP-specific TA offset in the first TAG configuration or the second TAG configuration.

Aspect 25 is the method of any of aspects 15-24, where the dynamic switch configuration may be based on a medium access control (MAC) control element (MAC-CE) or downlink control information (DCI).

Aspect 26 is the method of any of aspects 15-25, where the dynamic switch configuration may represent applying the first TAG configuration or the second TAG configuration for one or more slots or one or more symbols.

Aspect 27 is the method of any of aspects 15-26, where the dynamic switch configuration may be associated with one or more guard symbols for the first TAG configuration or the second TAG configuration for the first TRP or the second TRP.

Aspect 28 is an apparatus for wireless communication at a UE including a memory storing instructions and at least one processor coupled to the memory and configured to execute the instructions and cause the apparatus to perform a method in accordance with any of aspects 1-14. The apparatus may include at least one of a transceiver or an antenna coupled to the at least one processor.

Aspect 29 is an apparatus for wireless communications, including means for performing a method in accordance with any of aspects 1-14.

Aspect 30 is a non-transitory computer-readable medium including instructions that, when executed by an apparatus, cause the apparatus to perform a method in accordance with any of aspects 1-14.

Aspect 31 is an apparatus for wireless communication at a network entity including a memory storing instructions and at least one processor coupled to the memory and configured to execute the instructions and cause the apparatus to perform a method in accordance with any of aspects 15-27. The apparatus may include at least one of a transceiver or an antenna coupled to the at least one processor.

Aspect 32 is an apparatus for wireless communications, including means for performing a method in accordance with any of aspects 15-27.

Aspect 33 is a non-transitory computer-readable medium including instructions that, when executed by an apparatus, cause the apparatus to perform a method in accordance with any of aspects 15-27.

What is claimed is:

1. An apparatus for communication at a user equipment (UE), comprising:

memory; and at least one processor coupled to the memory and configured to:

receive, from a network entity, a first timing advance (TA) group (TAG) configuration;

receive, from the network entity, a second TAG configuration; and apply the first TAG configuration or the second TAG configuration based on a dynamic switch configuration representing an uplink (UL) transmission alignment or non-alignment for a first transmission reception point (TRP) associated with the network entity or a second TRP associated with the network entity.

2. The apparatus of claim 1, wherein the at least one processor coupled to the memory is further configured to:

receive, from the network entity, an indication of the dynamic switch configuration representing the UL transmission alignment or non-alignment for the first TRP associated with the network entity or the second TRP associated with the network entity.

3. The apparatus of claim 1, wherein the dynamic switch configuration represents applying the first TAG configuration for the first TRP and applying the second TAG configuration for the second TRP.

4. The apparatus of claim 1, wherein the dynamic switch configuration represents applying one of the first TAG configuration or the second TAG configuration for both the first TRP and the second TRP.

5. The apparatus of claim 4, wherein the one of the first TAG configuration or the second TAG configuration is defined in the dynamic switch configuration.

6. The apparatus of claim 4, wherein the one of the first TAG configuration or the second TAG configuration is a default TAG configuration.

7. The apparatus of claim 4, wherein the first TAG configuration or the second TAG configuration comprises a TRP-specific TA offset associated with the first TRP or the second TRP.

8. The apparatus of claim 1, wherein the at least one processor coupled to the memory is further configured to:

transmit, to the network entity, a report representing an application or non-application of the UL transmission alignment or non-alignment for simultaneous operation associated with the first TRP and the second TRP.

9. The apparatus of claim 8, wherein the report is based on a capability associated with the UE or a dynamic reporting, and wherein the report is based on a UL channel waveform.

10. The apparatus of claim 8, wherein the report represents the application of the UL transmission alignment or non-alignment, and wherein the dynamic switch configuration is based on the report and represents applying one of the first TAG configuration or the second TAG configuration for both the first TRP and the second TRP or applying a TRP-specific TA offset in the first TAG configuration or the second TAG configuration.

11. The apparatus of claim 8, wherein the report represents the non-application of the UL transmission alignment or non-alignment, and wherein the dynamic switch configuration is based on the report and represents applying the first TAG configuration for the first TRP and applying the second TAG configuration for the second TRP or not applying a TRP-specific TA offset in the first TAG configuration or the second TAG configuration.

12. The apparatus of claim 1, wherein the dynamic switch configuration is based on a medium access control (MAC) control element (MAC-CE) or downlink control information (DCI).

13. The apparatus of claim 1, wherein the dynamic switch configuration represents applying the first TAG configuration or the second TAG configuration for one or more slots or one or more symbols.

14. The apparatus of claim 1, wherein the dynamic switch configuration is associated with one or more guard symbols for the first TAG configuration or the second TAG configuration for the first TRP or the second TRP, further comprising at least one of a transceiver or an antenna coupled to the at least one processor.

15. An apparatus for communication at a network entity, comprising:

memory; and at least one processor coupled to the memory and configured to:

transmit a first timing advance (TA) group (TAG) configuration for a user equipment (UE);

transmit a second TAG configuration for the UE; and transmit an indication of a dynamic switch configuration representing an uplink (UL) transmission alignment or non-alignment for the UE corresponding to a first transmission reception point (TRP) associated with the network entity or a second TRP associated with the network entity, the dynamic switch configuration being associated with an application of the first TAG configuration or the second TAG configuration.

16. The apparatus of claim 15, wherein the dynamic switch configuration represents applying the first TAG configuration for the first TRP and applying the second TAG configuration for the second TRP.

17. The apparatus of claim 15, wherein the dynamic switch configuration represents applying one of the first TAG configuration or the second TAG configuration for both the first TRP and the second TRP.

18. The apparatus of claim 17, wherein the one of the first TAG configuration or the second TAG configuration is a default TAG configuration is defined in the dynamic switch configuration.

19. The apparatus of claim 17, wherein the one of the first TAG configuration or the second TAG configuration is a default TAG configuration.

20. The apparatus of claim 17, wherein the first TAG configuration or the second TAG configuration comprises a TRP-specific TA offset associated with the first TRP or the second TRP.

21. The apparatus of claim 15, wherein the at least one processor coupled to the memory is further configured to:

receive a report representing the application of the UL transmission alignment or non-alignment or a non-application of the UL transmission alignment or non-alignment for simultaneous operation associated with the first TRP and the second TRP.

22. The apparatus of claim 21, wherein the report is based on a capability associated with the UE or a dynamic reporting, and wherein the report is based on a UL channel waveform.

23. The apparatus of claim 21, wherein the report represents the application of the UL transmission alignment or non-alignment, and wherein the dynamic switch configuration is based on the report and represents applying one of the first TAG configuration or the second TAG configuration for both the first TRP and the second TRP or applying a TRP-specific TA offset in the first TAG configuration or the second TAG configuration.

24. The apparatus of claim 21, wherein the report represents the non-application of the UL transmission alignment or non-alignment, and wherein the dynamic switch configuration is based on the report and represents applying the first TAG configuration for the first TRP and applying the second TAG configuration for the second TRP or not applying a TRP-specific TA offset in the first TAG configuration or the second TAG configuration.

25. The apparatus of claim 15, wherein the dynamic switch configuration is based on a medium access control (MAC) control element (MAC-CE) or downlink control information (DCI).

26. The apparatus of claim 15, wherein the dynamic switch configuration represents applying the first TAG configuration or the second TAG configuration for one or more slots or one or more symbols.

27. The apparatus of claim 15, wherein the dynamic switch configuration is associated with one or more guard symbols for the first TAG configuration or the second TAG configuration for the first TRP or the second TRP.

28. The apparatus of claim 15, further comprising at least one of a transceiver or an antenna coupled to the at least one processor.

29. A method for communication at a user equipment (UE), comprising:

receiving, from a network entity, a first timing advance (TA) group (TAG) configuration;

receiving, from the network entity, a second TAG configuration; and applying the first TAG configuration or the second TAG configuration based on a dynamic switch configuration representing an uplink (UL) transmission alignment or non-alignment for a first transmission reception point (TRP) associated with the network entity or a second TRP associated with the network entity.

30. A method for communication at a network entity, comprising:

transmitting a first timing advance (TA) group (TAG) configuration for a user equipment (UE);

transmitting a second TAG configuration for the UE; and transmitting an indication of a dynamic switch configuration representing an uplink (UL) transmission alignment or non-alignment for the UE corresponding to a first transmission reception point (TRP) associated with the network entity or a second TRP associated with the network entity, the dynamic switch configuration being associated with an application of the first TAG configuration or the second TAG configuration.

* * * * *